(12) United States Patent
Van Druten et al.

(10) Patent No.: US 12,145,689 B2
(45) Date of Patent: Nov. 19, 2024

(54) TRANSMISSION SYSTEM

(71) Applicant: Advancing Technologies B.V., Eindhoven (NL)

(72) Inventors: Roell Marie Van Druten, Eindhoven (NL); Johannes Gijsbertus Antonius Van Den Brand, Eindhoven (NL)

(73) Assignee: ADVANCING TECHNOLOGIES B.V., Eindhoven (NL)

( * ) Notice: Subject to any disclaimer, the term of this patent is extended or adjusted under 35 U.S.C. 154(b) by 339 days.

(21) Appl. No.: 17/288,400

(22) PCT Filed: Oct. 25, 2019

(86) PCT No.: PCT/NL2019/050705
§ 371 (c)(1),
(2) Date: Apr. 23, 2021

(87) PCT Pub. No.: WO2020/085911
PCT Pub. Date: Apr. 30, 2020

(65) Prior Publication Data
US 2021/0354783 A1   Nov. 18, 2021

(30) Foreign Application Priority Data
Oct. 26, 2018  (NL) ..................... 2021891

(51) Int. Cl.
*B62M 25/08*   (2006.01)
*B62M 9/122*   (2010.01)
(Continued)

(52) U.S. Cl.
CPC ............ *B62M 25/08* (2013.01); *B62M 9/122* (2013.01); *B62M 11/16* (2013.01); *F16D 11/16* (2013.01);
(Continued)

(58) Field of Classification Search
CPC ........ B62M 9/10; B62M 11/16; B62M 11/18; B62M 25/08; B62M 9/12; B62M 9/122;
(Continued)

(56) References Cited

U.S. PATENT DOCUMENTS 3,492,883 A * 2/1970 Maeda ..................... B62M 9/10
192/48.92
4,145,095 A * 3/1979 Segawa ................. B60B 27/023
192/64

(Continued)

FOREIGN PATENT DOCUMENTS

| CN | 103587643 A | 2/2014 |
|---|---|---|
| CN | 204895738 A | 12/2015 |

(Continued)

OTHER PUBLICATIONS

European Examination Report—Communication Pursuant to Article 94(3) EPC from European Patent Office dated Jul. 14, 2023, 10 pages total.

(Continued)

*Primary Examiner* — Henry Y Liu
(74) *Attorney, Agent, or Firm* — Pillsbury Winthrop Shaw Pittman, LLP

(57) ABSTRACT

A transmission system, such as for a two wheeled bicycle, including an axle assembly including a set of sprockets, a transmission unit having an input coupled to the set of sprockets and an output arranged to be coupled to a wheel. The transmission unit includes a transmission operable according to a first transmission ratio and a second transmission ratio, a clutch or brake system for switching from the first to the second transmission ratio under load, and a first actuator for controlling the clutch or brake for coupling or decoupling. The transmission system including a second actuator for selecting one of the sprockets for transmission of torque to the axle assembly, and a controller configured (Continued)

to receive a first shift signal and/or a second shift signal, and configured to control the first actuator and/or the second actuator in response to the first or second shift signal.

23 Claims, 18 Drawing Sheets

(51) Int. Cl.
    *B62M 11/16*     (2006.01)
    *F16D 11/16*     (2006.01)
    *F16D 28/00*     (2006.01)
    *F16D 41/26*     (2006.01)
    *F16D 41/30*     (2006.01)

(52) U.S. Cl.
    CPC ............. *F16D 28/00* (2013.01); *F16D 41/26* (2013.01); *F16D 41/30* (2013.01); *F16D 2500/1023* (2013.01); *F16D 2500/104* (2013.01); *F16D 2500/1087* (2013.01); *F16D 2500/1107* (2013.01)

(58) Field of Classification Search
    CPC .. F16H 3/663; F16H 2200/0034; F16D 11/16; F16D 28/00; F16D 41/26; F16D 41/03; F16D 2500/1023; F16D 2500/104; F16D 2500/1087; F16D 2500/1107
    USPC ................................. 474/160, 165; 475/12
    See application file for complete search history.

(56) References Cited

U.S. PATENT DOCUMENTS

| | | | | |
|---|---|---|---|---|
| 4,154,123 A * | 5/1979 | Nagano | ................... | B62M 9/10 474/81 |
| 4,154,327 A * | 5/1979 | Haeussinger | .......... | B62K 25/02 192/64 |
| 4,278,265 A * | 7/1981 | Nagano | ................ | B60B 27/023 280/238 |
| 4,296,850 A * | 10/1981 | Isobe | ....................... | B62M 9/10 192/64 |
| 4,344,659 A * | 8/1982 | Shimano | ................. | F16C 33/80 384/480 |
| 4,400,999 A | 8/1983 | Steuer | | |
| 4,650,049 A * | 3/1987 | Stephens | ................... | B62L 5/00 192/114 R |
| 4,869,710 A * | 9/1989 | Iwasaki | ................... | F16D 41/30 474/160 |
| 5,129,711 A * | 7/1992 | Chen | ...................... | B62K 25/02 192/48.92 |
| 5,273,500 A * | 12/1993 | Nagano | ................. | B62M 11/18 192/217.4 |
| 5,322,487 A * | 6/1994 | Nagano | ................. | B62M 11/18 192/217.4 |
| 5,426,997 A * | 6/1995 | Brion | ...................... | F16D 41/30 192/64 |
| 5,527,230 A * | 6/1996 | Meier-Burkamp | .... | B62M 11/18 475/275 |
| 5,562,563 A * | 10/1996 | Shoge | .................... | B62M 11/18 475/289 |
| 5,788,593 A * | 8/1998 | Tiong | ...................... | B62M 9/10 474/160 |
| 5,967,937 A * | 10/1999 | Matsuo | .................. | B62M 11/16 475/297 |
| 6,045,475 A * | 4/2000 | Yoo | ........................ | B62M 11/14 475/296 |
| 6,048,287 A * | 4/2000 | Rohloff | ................... | F16H 3/663 475/289 |
| 6,102,821 A * | 8/2000 | Nakamura | ............... | B62M 9/10 474/160 |
| 6,125,979 A * | 10/2000 | Costin | ..................... | F16D 41/14 192/103 B |
| 6,338,403 B1 * | 1/2002 | Costin | ..................... | F16D 41/12 192/110 B |
| 6,488,603 B2 * | 12/2002 | Lim | ......................... | B62M 9/10 192/64 |
| 6,533,700 B2 * | 3/2003 | Shoge | ..................... | B62M 11/16 475/275 |
| 6,641,500 B2 * | 11/2003 | Shoge | .................... | B62M 25/08 192/48.92 |
| 6,875,150 B2 * | 4/2005 | Matsuo | ................... | B62M 11/16 475/288 |
| 7,435,197 B2 * | 10/2008 | Kamada | .................... | B62M 9/10 474/902 |
| 7,670,251 B2 * | 3/2010 | Okochi | ..................... | B62L 5/10 475/330 |
| 8,052,568 B2 * | 11/2011 | Hino | ....................... | B62M 11/16 475/12 |
| 8,992,375 B2 * | 3/2015 | Gobel | ..................... | B62M 11/18 475/349 |
| 9,193,416 B2 * | 11/2015 | Tokuyama | ................ | B62M 9/10 |
| 10,377,174 B2 * | 8/2019 | Fujita | ................... | B60B 27/0021 |
| 10,604,213 B2 * | 3/2020 | Van Den Brand | ..... | B62M 11/16 |
| 10,946,931 B2 * | 3/2021 | Fujita | ........................ | B62M 9/10 |
| 11,180,217 B2 * | 11/2021 | Tokuyama | ................ | B62M 9/10 |
| 11,208,171 B2 * | 12/2021 | Mandaric | ................. | B62M 9/12 |
| 11,383,553 B2 * | 7/2022 | Van Den Brand | ....... | B62M 9/10 |
| 11,603,166 B2 * | 3/2023 | Fujita | ..................... | B62M 9/125 |
| 2003/0160420 A1 * | 8/2003 | Fukuda | .................. | B62M 25/08 280/260 |
| 2005/0197230 A1 * | 9/2005 | Steuer | ..................... | B62M 11/18 475/296 |
| 2005/0252750 A1 * | 11/2005 | Matsueda | .............. | B62M 11/16 192/217.4 |
| 2005/0255950 A1 * | 11/2005 | Takebayashi | .......... | B62M 9/132 474/70 |
| 2007/0207885 A1 * | 9/2007 | Watarai | ................... | B62M 25/08 474/70 |
| 2008/0200292 A1 * | 8/2008 | Goring | .................. | B60B 27/023 192/64 |
| 2008/0312799 A1 * | 12/2008 | Miglioranza | .......... | B62M 25/08 701/66 |
| 2011/0241306 A1 | 10/2011 | Serkh et al. | | |
| 2014/0284897 A1 * | 9/2014 | Bettin | ...................... | F16H 37/04 280/260 |
| 2015/0210354 A1 * | 7/2015 | Kuroda | ................... | B62M 25/08 474/70 |
| 2015/0307157 A1 | 10/2015 | Gao | | |
| 2016/0272281 A1 * | 9/2016 | Tsai | ....................... | B62M 25/08 |

FOREIGN PATENT DOCUMENTS

| | | |
|---|---|---|
| CN | 107031787 A | 8/2017 |
| EP | 0687622 A1 | 12/1995 |
| EP | 2426043 A1 | 3/2012 |
| WO | 2018/199757 A2 | 11/2018 |
| WO | 2020/085911 A2 | 4/2020 |
| WO | 2021/080431 A1 | 4/2021 |
| WO | 2022/248136 A2 | 12/2022 |

OTHER PUBLICATIONS

Office Action dated Apr. 21, 2022 issued in corresponding Chinese Patent Application No. 201980086576.5, with English translation (17 pgs.).
International Search Report dated Jun. 26, 2020, issued in corresponding International Patent Application No. PCT/NL2019/050705 (8 pgs.).
International Search Report dated May 16, 2023, issued in corresponding International Application No. PCT/EP2022/085046 (10 pgs.).
Simon Von Bromley: "This humble custom TT bike has just been ridden to a new sub-3-hour 100-mile record", Internet Citation, Nov. 4, 2020 (Nov. 4, 2020), pp. 1-8, XP009539666, Retrieved from the Internet: URL:https://www.bikeradar.com/features/pro-bike/johnathan-shubert-100-miles-3-hours/?image=3&type=gallery&gallery=3&embedded_slideshow=3 [retrieved on Nov. 4, 2020].

(56) References Cited

OTHER PUBLICATIONS

Cycledogg: "What's the biggest chainring you ever used", Internet Citation, Oct. 7, 2018 (Oct. 7, 2018), pp. 1-12, XP009539669, Retrieved from the Internet: URL:https://www.bikeforums.net/road-cyclin g/1149273-what-s-biggest-chainring-you-ever-used.html [retrieved on Oct. 7, 2018].
Bigsas: "Triathlon Forum", Internet Citation, Apr. 3, 2019 (Apr. 3, 2019), pp. 1-5, XP009539668, Retrieved from the Internet: URL:https://forum.slowtwitch.com/forum/Slowtwitch_Forums_CI/Triathlon_Forum_FI/58/44T_chainring_setup_P6900854/ [retrieved on Apr. 3, 2019].
Anonymous: "SRAM PG 1050 10-speed cassette nu bestellen Rose Bikes", Jul. 2, 2019 (Jul. 2, 2019), XP055970733, Retrieved from the Internet: URL:https://www.rosebikes.nl/sram-pg-1050-10-speed-cassette-477035?article_size=7869 &product_shape=I [retrieved on Oct. 13, 2022].
Unknown: "Shimano Ultegra CS-6500 9-speed cassette 12-25", Sep. 19, 2019 (Sep. 19, 2019), XP055970722, Retrieved from the Internet: URL:https://www.rosebikes.nl/shimano-ulteg ra-cs-6500-9-speed-cassette-12-25-43865 [retrieved on Oct. 13, 2022].
Marcus_Ti: "General Cycling Discussion", Internet Citation, Jun. 1, 2018 (Jun. 1, 2018), pp. 1-14, XP009539667, Retrieved from the Internet: URL:https://www.bikeforums.net/general-cyc ling-discussion/1168521-52t-vs-70t-pic-7.html [retrieved on Jun. 1, 2018].
Velotik: "Drag 2 Zero D2Z 58t chainring with AXS 12 follow up review", Jul. 12, 2021 (Jul. 12, 2021), XP055968458, Retrieved from the Internet: URL:https://www.youtube.com/watch?v=r02BqV1K298 [retrieved on Oct. 5, 2022].
Hughes ADE: "New Chainring: Ade's Road Cycling Blog", Ade's Road Cycling Blog, Feb. 22, 2020 (Feb. 22, 2020), pp. 1-5, XP093037455, Retrieved from the Internet: URL:https://ade2010ejog.wordpress.com/2020/02/22/new-chainring/ [retrieved on Apr. 4, 2023].
Catchpole Glenn: "Drive Chain Efficiency—Big vs Small—Velobike", Velobike, Aug. 30, 2019 (Aug. 30, 2019), XP093037457, Retrieved from the Internet: URL:https://www.velobike.co.nz/blogs/news/drive-chain-efficiency-big-vs-small [retrieved on Apr. 4, 2023].
Watts Logan: "The New MicroSHIFT Acolyte Ix8 Drivetrain—bikepacking.com", Bikepacking, Sep. 10, 2020 (Sep. 10, 2020), XP93038278, Retrieved from the Internet: URL:https://bikepacking.com/news/microshift-acolyte-1x8/ [retrieved on Apr. 11, 2023].

\* cited by examiner

TRANSMISSION SYSTEM

CROSS-REFERENCE TO RELATED APPLICATIONS

This application claims priority to PCT/NL2019/050705, filed Oct. 25, 2019, which in turn claims priority to NL 2021891, filed Oct. 26, 2018, all contents of each of which are hereby incorporated by reference in their entireties.

FIELD OF THE INVENTION

The invention relates to a transmission system, such as for a, e.g. two-wheeled, bicycle, having an input arranged for connection to a drive source, and an output arranged for connection to a load.

BACKGROUND TO THE INVENTION

Transmission systems for bicycles are known. In bicycles, especially racing bicycles, the transmission system traditionally includes a front derailleur and a rear derailleur, for shifting gears of the transmission system. An alternative to derailleurs is formed by gear hubs, where shifting of gears is accommodated by a gear shifting mechanism inside the, generally rear, wheel hub. A hybrid form is known where a gear hub torque transmission having at least two selectable gear ratios is coupled between the rear wheel hub and the rear sprocket. Herein the rear sprocket can include a plurality of gear wheels, selectable through a rear derailleur. Here the gear hub can take the place of a front derailleur.

Such gear hub gear shifting mechanisms can include one or more planetary gear sets. The planetary gear includes at least three rotational members, such as a sun gear, a planet carrier and a ring gear. A clutch system can be used for selectively coupling two of the rotational members, e.g. the planet carrier and the ring gear. When coupled, the hub gear shifting mechanism operates according to a first gear ratio. When decoupled, the hub gear shifting mechanism operates according to a second gear ratio.

Also gear hub shifting mechanisms are known wherein mechanisms are included in the gear hub for providing a plurality of different transmission ratios, such as five, seven or fourteen different gear ratios.

Many of these systems have in common that up- and downshifting is not always possible, depending on the riders pedal force. In some systems, it is required that the rider stops pedaling, or at least stops providing torque load to the system to allow up-shifting and/or down-shifting.

Also, upshifting or downshifting can be cumbersome if the rider has to use two shifters, such as for a front derailleur and a rear derailleur.

Also, upshifting or downshifting can be cumbersome when shifting chain wheel using a front derailleur, resulting in a large change in transmission ration, which the rider normally has to counteract by shifting the rear derailleur for compensating the large change in transmission ratio.

SUMMARY OF THE INVENTION

It is an object to provide a transmission system for a two wheeled bicycle. Alternatively, or additionally, it is an object to enable, preferably electronically actuated, shifting of gears, wherein up- and downshifting should always be possible, not depending on the riders pedal force and/or electromotor torque. Alternatively, or additionally, it is an object to enable simplified and/or less cumbersome shifting of gear ratio.

According to an aspect is provided a transmission system, such as for a two wheeled bicycle. The transmission system includes a set of sprockets, having varying numbers of teeth, such as a cassette. The number of teeth of the sprockets may increase from one sprocket to the next in a geometric order. The transmission system can include a chain driven by a chain ring and transferring torque from a system input, such as a crank, to one of the sprockets. The transmission system includes a transmission unit having an input coupled to the system input or to the set of sprockets and an output arranged to be coupled, respectively, to the chain ring or to a wheel, e.g. to a wheel hub or spoke flange. The wheel can be a rear wheel of a bicycle. The transmission unit includes a transmission operable according to a first transmission ratio and a second transmission ratio and an actuation system for switching from the first to the second transmission ratio (the first or second transmission ratio can be a 1:1 coupling). The actuation system is arranged to switch under load, possibly in two shift directions (upshift and downshift). The transmission unit includes a first actuator for controlling the actuation system for switching. The transmission can e.g. include a planetary gear set. The transmission system includes a second actuator for selecting the torque transfer from the chain to one of the sprockets for transmission of torque to the axle assembly, e.g. by moving the sprockets and/or the chain. The second actuator can e.g. be associated with a rear derailleur. The transmission system includes a controller configured to receive a first shift signal and a second shift signal, and configured to control the first actuator and/or the second actuator in response to the first and/or second shift signal.

The actuation system can include a clutch or brake system for switching from the first to the second transmission ratio or vice versa, arranged to couple and/or decouple under load. Hence can be provided a transmission system, such as for a two wheeled bicycle. The transmission system includes an axle assembly. The axle assembly includes a set of sprockets, having varying numbers of teeth, such as a cassette. The number of teeth of the sprockets may increase from one sprocket to the next in a geometric order. The axle assembly includes a transmission unit having an input coupled to the set of sprockets and an output arranged to be coupled to a wheel, e.g. to a wheel hub or spoke flange. The wheel can be a rear wheel of a bicycle. The transmission unit includes a transmission operable according to a first transmission ratio and a second transmission ratio and a clutch or brake system for switching from the first to the second transmission ratio. The clutch or brake system is arranged to couple and/or decouple under load, preferably in two shift directions. The transmission unit includes a first actuator for controlling the clutch or brake for coupling or decoupling. The transmission can e.g. include a planetary gear set. The transmission system can include a chain driven by a chain ring and transferring torque from a system input, such as a crank, to one of the sprockets. The transmission system includes a second actuator for selecting one of the sprockets for transmission of torque to the axle assembly, e.g. by moving the sprockets and/or the chain. The second actuator can e.g. be associated with a rear derailleur. The transmission system includes a controller configured to receive a first shift signal and/or a second shift signal, and configured to control the first actuator and/or the second actuator in response to the first and/or second shift signal.

The controller allows for simplified operation of the transmission system. The transmission can maintain torque transfer during the switch from the first to the second transmission ratio or vice-versa.

The first shift signal can be an upshift signal and the second shift signal can be a downshift signal. The controller can be configured to selectively control the first and/or second actuator for selecting the next higher system transmission ratio, between system input and output, in response to receiving the upshift signal, and for selecting the next lower system transmission ratio in response to receiving the downshift signal. Hence, the rider only needs to provide the upshift signal or the downshift signal, e.g. by means of one or more controls, levers, switches or the like. Preferably, the first and second shift signals are electronic signals. The controller then controls the first and second actuators in response to the upshift or downshift signal provided by the rider. Depending on the transmission ratio used at that point in time, the next higher transmission ratio can be achieved by actuating the first actuator and/or the second actuator. The controller is configured to select and actuate the appropriate actuator. Thus, shifting is simplified for the user. Optionally, the first and second actuators are arranged for being operated electronically by the controller. The transmission system can be arranged such that the transmission ratios through which can be shifted can be chosen or adapted by the user. The second next, third next, fourth next or fifth next higher or lower system transmission ratio can be chosen or adapted by the user.

The clutch or brake system is arranged to couple and decouple under load, preferably in two shift directions. It is noted that conventional clutch or brake systems for use in a transmission system in a wheel axle assembly, especially for a bicycle, are not suitable for coupling and decoupling under load. As described herein a clutch or brake system allowing coupling and decoupling under load is provided. This provides the advantage that shifting is further simplified in that the rider need not halt pedaling or reduce torque provided to the transmission system.

Optionally, the first shift signal and the second shift signal come from a shifter unit that is mounted on one side of the handle bar of the bicycle. Optionally, the first shift signal comes from a first shifter unit that is mounted on the left side of the handle bar of the bicycle and the second shift signal comes from a second shifter unit that is mounted on the right side of the handle bar of the bicycle, or vice-versa.

It is possible that the controller is configured to receive a third shift signal and a fourth shift signal, wherein the first shift signal is an upshift signal for the first actuator, the second shift signal is a downshift signal for the first actuator, wherein the third shift signal is an upshift signal for the second actuator, and the fourth shift signal is a downshift signal for the second actuator, and wherein the controller is configured to control the first actuator on the basis of the first and second shift signals, and to control the second actuator on the basis of the third and fourth shift signals. Thus, the first and second shift signals can be shift signals for the rear derailleur and the third and fourth shift signals can be shift signals for the transmission unit, e.g. mimicking operation of a front derailleur.

Optionally, the transmission is a continuously variable transmission that is used to switch, or shift, from the first to the second transmission ratio or vice-versa. While switching from the first to the second transmission ratio or vice-versa, the continuously variable transmission can traverse all (continuous) intermediate transmission ratios. The continuously variable transmission can also used to switch from the first to a second and to a third transmission ratio or vice-versa.

The first and the second, and possibly the third, transmission ratio can be chosen by the controller and possibly preprogrammed by the user. The user can e.g. select desired transmission ratios and set these in the controller. Thereto, the controller can include a user interface. It is also possible that the transmission ratios are selected on a communications device, such as a smartphone or tablet, and communicated to the controller. A computer program product, such as an app, can thereto be executed on the communications device.

The transmission ratio(s) can be chosen by the controller and can be adapted depending on the sprocket that is engaged with the chain. It is also possible that the user preprograms transmission ratios depending on the sprocket that can be engaged with the chain.

Optionally, the transmission unit has an input coupled to the set of sprockets and an output arranged to be coupled to a wheel. Alternatively, the transmission unit can have an input coupled to the system input and an output arranged to be coupled to the chain ring.

According to an aspect, two consecutive sprockets have a number of teeth differing by more than a predetermined percentage, and the first and second transmission ratios of the transmission differ by less than the predetermined percentage. As a result, shifting from the one sprocket to the consecutive sprocket changes the transmission ratio by more than the predetermined percentage, and shifting of the transmission unit can be used to provide an intermediate transmission ratio, between the transmission ratios of the two consecutive sprockets. This allow for simple shifting, wherein between two sprocket shifts a transmission unit shift can be used for providing smooth shifting.

Conventionally, a variation in transmission ratio between two consecutive sprockets is about 6-12 percent. Optionally, two consecutive sprockets have a number of teeth differing by 5-20 percent. Hence, a difference in transmission ratio between two consecutive sprockets can be larger than conventional, an intermediate transmission ratio being realizable with the transmission unit, if the first and second transmission ratios of the transmission differ by a smaller percentage than the consecutive sprockets, e.g. less than 5-20 percent. Thus, a set of sprockets can span a larger range of transmission ratios than conventionally. Alternatively, or additionally, a difference between two transmission ratios can be made smaller than conventional, allowing for smoother shifting. Preferably two consecutive sprockets have a number of teeth differing by 10-30 percent, more preferably by 12-25 percent. Preferably the first and second transmission ratios of the transmission differ by less than 6-15 percent, more preferably by less than 7-11 percent.

Optionally, each pair of consecutive sprockets has their number of teeth differing by 10-30 percent, preferably by 12-25 percent, and the first and second transmission ratios of the transmission differ by a smaller percentage than the consecutive sprockets. Optionally, the first and second transmission ratios of the transmission differ by less than 10-30 percent, preferably by less than 12-25 percent. Hence, smooth and simplified shifting can be provided throughout the range of transmission ratios provided by the set of sprockets.

Optionally, all pairs of consecutive sprockets have their number of teeth differing by 10-30 percent on average, preferably by 12-25 percent, Preferably, first and second transmission ratios of the transmission differ by a smaller percentage than the average, e.g. by less than 5-20 percent, preferably by less than 6-15 percent, more preferably by less than 7-11 percent. Optionally, on average, all pairs of consecutive sprockets have their number of teeth differing by a predetermined percentage, and the first and second transmission ratios of the transmission differ by less than the predetermined percentage.

According to an aspect, the first transmission ratio and the second transmission ratio differ by about 20-60 percent, such as 30-40 percent. Hence, shifting transmission ratio of the transmission unit provides a larger step in transmission ratio, e.g. enabling so-called bail-out for suddenly dropping or increasing the transmission ratio. It will be appreciated that it is also possible that bail-out is provided by the controller. The controller can e.g. be configured to reduce the transmission ratio by a preset amount (e.g. an equivalent of three or more conventional sprockets down, or an equivalent of one conventional chain wheel down), such as 20-60 percent instantaneously. The controller can be configured to receive a fifth shift signal. The fifth shift signal can be a bail-out signal.

It will be appreciated that a controller configured to receive a bail-out signal and control transmission system actuators to change a transmission ratio of the transmission system to be reduced by 20-60 percent in response to receiving the bail-out signal can be used in alternative transmission systems as well. The controller can be configured to selectively control the first and/or second actuator for selecting the second next, third next, fourth next or fifth next higher or lower system transmission ratio in response to receiving the bail-out signal.

Optionally, the first shift signal is an upshift signal and the second shift signal is a downshift signal, and the bail-out signal comprises the upshift signal and downshift signal being provided at the same time, or within a specified time-interval, typically smaller than 1 second.

According to an aspect is provided a transmission system, such as for a bicycle, including a controller configured to receive a bail-out signal and control ne or more transmission system actuators to change a transmission ratio of the transmission system to be reduced by 20-60 percent in response to receiving the bail-out signal.

According to an aspect, the clutch or brake system has a clutch input, and a clutch output. The clutch or brake system includes a first unit connectable to the clutch input or clutch output, including at least one first abutment surface. The clutch or brake system includes a second unit connectable to the clutch output or clutch input, respectively, including at least one second abutment surface arranged for selectively engaging the first abutment surface, the first and second abutment surfaces being adapted to each other so as to allow disengaging under load, preferably in two, e.g. rotational, directions. The clutch or brake system including a third unit including at least one retaining member, the third unit being arranged for selectively being in a first mode or a second mode relative to the second unit, wherein the at least one retaining member in the first mode locks the at least one second abutment surface for rotationally coupling the second unit to the first unit, preferably in two, e.g. shift, directions, and in the second mode releases the at least one second abutment surface for decoupling the second unit from the first unit.

Optionally, the controller is arranged to initiate a transmission ratio change based on a wheel-speed, a crank-speed, a crank-torque, a wheel-torque, and/or other available parameters. Thus, the controller can provide automated shifting of the transmission ratio, e.g. without rider intervention.

According to an aspect is provided an axle assembly, such as for a two wheeled bicycle, including a set of sprockets, two consecutive sprocket having a number of teeth differing by more than a predetermined percentage. The axle assembly includes a transmission unit having an input coupled to the set of sprockets and an output arranged to be coupled to a wheel. The transmission unit includes a transmission operable according to a first transmission ratio and a second transmission ratio, wherein the first and second transmission ratios differ by less than the predetermined percentage, and an actuation system for switching from the first to the second transmission ratio, arranged to switch under load. As a result, shifting from the one sprocket to the consecutive sprocket changes the transmission ratio by more than the predetermined percentage, and shifting of the transmission unit can be used to provide an intermediate transmission ratio, between the transmission ratios of the two consecutive sprockets. This allow for simple shifting, wherein between two sprocket shifts a transmission unit shift can be used for providing smooth shifting.

According to an aspect is provided an axle assembly, such as for a two wheeled bicycle, including a set of sprockets, two consecutive sprocket having a number of teeth differing by more than a predetermined percentage. The axle assembly includes a transmission unit having an input coupled to the set of sprockets and an output arranged to be coupled to a wheel. The transmission unit includes a transmission operable according to a first transmission ratio and a second transmission ratio, wherein the first and second transmission ratios differ by about 20-60 percent, and an actuation system for switching from the first to the second transmission ratio, arranged to switch under load.

The actuation system can include a clutch or brake system for switching from the first to the second transmission ratio or vice versa, arranged to couple and/or decouple under load. The transmission can maintain torque transfer during the switch from the first to the second transmission ratio or vice-versa.

Optionally, the transmission is a continuously variable transmission that is used to switch, or shift, from the first to the second transmission ratio or vice-versa. While switching from the first to the second transmission ratio or vice-versa, the continuously variable transmission can traverse all (continuous) intermediate transmission ratios. The continuously variable transmission can also used to switch from the first to a second and to a third transmission ratio or vice-versa.

The first and the second, and possibly the third, transmission ratio can be chosen by the controller and possibly preprogrammed by the user. The user can e.g. select desired transmission ratios and set these in the controller. Thereto, the controller can include a user interface. It is also possible that the transmission ratios are selected on a communications device, such as a smartphone or tablet, and communicated to the controller. A computer program product, such as an app, can thereto be executed on the communications device.

The transmission ratio(s) can be chosen by the controller and can be adapted depending on the sprocket that is engaged with the chain. It is also possible that the user preprograms transmission ratios depending on the sprocket that can be engaged with the chain.

Optionally, the transmission unit has an input coupled to the set of sprockets and an output arranged to be coupled to a wheel. Alternatively, the transmission unit can have an input coupled to the system input and an output arranged to be coupled to the chain ring.

Optionally, the clutch or brake system of the axle assembly has a clutch input, and a clutch output, the clutch including a first unit connectable to the clutch input or clutch output, including at least one first abutment surface, a second unit connectable to the clutch output or clutch input, respectively, including at least one second abutment surface arranged for selectively engaging the first abutment surface, the first and second abutment surfaces being adapted to each other so as to allow disengaging under load, preferably in two directions, a third unit including at least one retaining member, the third unit being arranged for selectively being in a first mode or a second mode relative to the second unit, wherein the at least one retaining member in the first mode locks the at least one second abutment surface for rotationally coupling the second unit to the first unit, preferably in two directions, and in the second mode releases the at least one second abutment surface for decoupling the second unit from the first unit.

According to an aspect is provided a bicycle wheel including the axle assembly, or the transmission system as described hereinabove.

According to an aspect is provided a bicycle including the transmission system, or the axle assembly as described hereinabove.

Alternatively, or additionally, it is an object to provide a clutch or brake system, e.g. for a torque transmission, which is cost-effective, can be manufactured with a small size, is easy to operate and/or is durable. Alternatively, or additionally, it is an object to provide a clutch or brake system, e.g. for a torque transmission, which can be operated under load, e.g. while pedaling. Alternatively, or additionally, it is an object to provide a clutch or brake system, e.g. for a torque transmission, which can be operated for coupling and/or for decoupling under load, e.g. while pedaling. Alternatively, or additionally, it is an object to provide a clutch or brake system, e.g. for a torque transmission, which can be operated both for upshifting and for downshifting under load, e.g. while pedaling. More in general it is an object to provide an improved clutch or brake system, e.g. for a torque transmission, or at least an alternative clutch or brake system, e.g. for a torque transmission.

According to an aspect is provided a clutch or brake system, e.g. for use in the transmission system and/or axle assembly, having an input, and an output. The system includes a first unit connectable to the input or output, and a second unit connectable to the output or input, respectively. The first unit includes at least one first abutment surface. The second unit includes at least one second abutment surface arranged for selectively engaging the first abutment surface. The first and second abutment surfaces are adapted to each other so as to allow disengaging under load. The system includes a third unit. The third unit includes at least one retaining member. The third unit is arranged for selectively being in a first mode or a second mode relative to the second unit. In the first mode the at least one retaining member locks the at least one second abutment surface for rotationally coupling the second unit to the first unit. In the second mode the at least one retaining member releases the at least one second abutment surface for decoupling the second unit from the first unit.

Such clutch or brake system can be advantageously used in the transmission system as described hereinabove.

According to an aspect at least one of the first unit, the second unit, and the third unit is rotatable. Optionally, at least two of the first unit, the second unit, and the third unit are rotatable. Optionally, all of the first unit, the second unit, and the third unit are rotatable.

According to an aspect the first unit or the second unit is non-rotatable. The non-rotatable first unit or second unit can be used for braking a rotatable second unit or first unit, respectively. Optionally, two of the first unit, the second unit, and the third unit are non-rotatable.

According to an aspect is provided a clutch or brake system, such as for a torque transmission. Such clutch or brake system can be used in a vehicle, such as a bicycle or car, a windmill, or the like. The clutch or brake system has an input, e.g. arranged for connection to a drive source, and an output, e.g. arranged for connection to a load. Preferably, the clutch system is operable under load between the input and the output. More preferably, the clutch system is operable under load between the input and the output both when coupling and when decoupling. Preferably, the clutch system is operable under load between the input and the output both during upshift and downshift of the torque transmission. The clutch system includes a first, e.g. rotatable, unit, e.g. a housing, connectable to the input or the output. The clutch system includes a second, e.g. rotatable, unit connectable to the output or input, respectively. The first unit includes at least one first abutment surface. The second unit includes at least one second abutment surface arranged for selectively engaging the first abutment surface. The first and second abutment surfaces are adapted to each other so as to allow disengaging under load, e.g. so as to disengage under load. The clutch or brake system includes a third, e.g. rotatable, unit. The third unit can be arranged for co-rotating with the second unit. The third unit includes at least one retaining member. The third unit is arranged for selectively being in a first mode, such as a first position, or a second mode, such as a second position, relative to the second unit. It will be appreciated that the first position can be a first rotational and/or axial position, and the second position can be a second, different, rotational and/or axial position. The at least one retaining member in the first mode locks the at least one second abutment surface in engagement with the at least one first abutment surface for rotationally coupling the second unit to the first unit. The at least one retaining member in the second mode releases the at least one second abutment surface for disengagement of the at least one first abutment surface for decoupling the second unit from the first unit.

Hence, while the first and second abutment surfaces are adapted to each other so as to allow disengaging under load, or to disengage under load, the relative arrangement, e.g. positioning, of the second and third rotatable units can in the first mode lock the at least one second abutment surface in engagement with the at least one first abutment surface, and in the second mode release the at least one second abutment surface for disengagement of the at least one first abutment surface. Hence, in the first mode, the second unit can be rotationally coupled to the first unit, and in the second mode the second unit can be decoupled from the first unit. Thus a simple and efficient clutch or brake system can be provided.

Optionally, the third unit is arranged for co-rotating with the second unit, and the system is arranged for temporarily changing rotation speed of the third unit relative to the second unit, e.g. by temporarily speeding up, braking or halting the second and/or third unit, for rotating from the first position to the second position, or from the second position to the first position.

Optionally, the clutch system includes an actuator for rotating the third unit and/or the second unit from the first position to the second position, and/or from the second position to the first position. The actuator can be triggerable from outside the clutch system, such as via a control unit.

The actuator can e.g. be triggered by external means. The actuator can e.g. be triggered by electrical means or mechanical means. The actuator can e.g. be triggered by manual means such as a user operated button or lever. The actuator can e.g. be triggered by automatic means, such as a controller. The clutch system can include input means. The input means can be arranged for receiving a trigger for triggering the actuator. Triggering of the actuator can be independent of internal forces, torques and/or rotational speeds in the clutch system. Hence, the clutch system can be operated under control of a user or user device.

Optionally, the clutch system includes an actuator for rotating the third unit and/or the second unit from the first position to the second position, and/or from the second position to the first position.

According to an aspect is provided a clutch or brake system, such as for a torque transmission. Such clutch or brake system can be used in a vehicle, such as a bicycle or car, a windmill, or the like. The clutch or brake system has an input, e.g. arranged for connection to a drive source, and an output, e.g. arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The clutch or brake system includes a first, e.g. rotatable, unit, e.g. a housing, connectable to the input or output. The clutch system includes a second, e.g. rotatable, unit connectable to the output or input, respectively. The clutch or brake system includes a third, e.g. rotatable, unit arranged for co-rotating with the second unit. The third unit is arranged for selectively being in a first mode, e.g. rotational position, or a second mode, e.g. rotational position, relative to the second unit. The system is arranged for selectively in the first mode rotationally coupling the second unit to the first unit, and in the second mode decoupling the second unit from the first unit. The system is arranged for temporarily changing rotation speed of the third unit relative to the second unit, e.g. by temporarily speeding up, braking or halting the second and/or third unit, for going, e.g. rotating, from the first mode to the second mode, or from the second mode to the first mode. Hence, the second and third units can in a simple manner be brought from the first mode to the second mode or vice versa.

Optionally, the first unit includes at least one first abutment surface, and the second unit includes at least one second abutment surface arranged for selectively engaging the first abutment surface. The third unit in the first mode, e.g. position, locks the at least one second abutment surface in engagement with the at least one first abutment surface for rotationally coupling the second unit to the first unit, and in the second mode, e.g. position, releases the at least one second abutment surface for disengagement of the at least one first abutment surface for decoupling the second unit from the first unit.

Optionally, the third unit is rotatable relative to the second unit. Optionally a rotation angle of the third unit relative to the second unit is more than 360 degrees. Optionally a rotation angle of the third unit relative to the second unit is unlimited. The clutch or brake system can be free from stop means limiting the rotation angle of the third e unit relative to the second unit.

Optionally, the third unit is arranged to be rotated relative to the second unit from the first position to the second position, and from the second position to the first position in one and the same rotational direction. The third unit can be rotated relative to the second unit in a continued forward rotation for being moved from the first position to the second position, and from the second position to the first position. The third unit can be rotated relative to the second unit in a continued rearward rotation for being moved from the first position to the second position, and from the second position to the first position.

Optionally, the third unit is arranged for selectively being in one of a plurality of first or second positions relative to the second unit. The third unit in each of the first positions of the plurality of first positions locks the at least one second abutment surface in engagement with the at least one first abutment surface for rotationally coupling the second unit to the first unit. The third unit in each of the second positions of the plurality of second positions releases the at least one second abutment surface for disengagement of the at least one first abutment surface for decoupling the second unit from the first unit. The third unit can be arranged to be rotated relative to the second unit from a first first position to a first second position, and from the first second position to a second first position in one and the same rotational direction. The third unit can be arranged to be rotated relative to the second unit from the second first position to a second second position, and from the second second position to a third first position (or to a third first position) in the same one and the same rotational direction. The first positions of the plurality of first positions can e.g. be equally spaced around the perimeter of the second unit. The second positions of the plurality of second positions can e.g. be equally spaced around the perimeter of the second unit. The first positions and second positions can be alternatingly and preferably equally spaced around the perimeter of the second unit. For example, three first positions and three second positions are alternatingly spaced at 60 degrees around the perimeter of the second unit.

Optionally, the second and third units are free from biasing force relative to each other, such that the third unit is not forced into a first or second position relative to the second unit by a force, such as a spring force.

Optionally, the engagement or disengagement of the second abutment surface with the at least one first abutment surface is independent of input torque and/or rotation speed, but relies only on the second and third units being in the first or second relative positions.

Optionally, the at least one second abutment surface of the second rotatable unit is hingedly connected to the remainder of the second unit. Optionally, the at least one second abutment surface of the second unit is hingedly connected to the remainder of the second unit so as to have a single pivot axis.

Optionally, the third unit includes at least one, e.g. as at least two, actuation member arranged for moving the third unit from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second unit.

Optionally, the clutch system further includes a, e.g. non-rotatable, fourth unit. The fourth unit includes a selector. The selector is arranged for selectively being in a gripping or non-gripping mode. The selector in the gripping mode is arranged for gripping the at least one actuation member for rotating the third unit from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second unit. The selector in the non-gripping mode is arranged for not engaging the at least one actuation member. The selector in the non-gripping mode can allow the third unit to freely rotate with the second unit.

According to an aspect is provided a clutch or brake system, such as for a torque transmission. Such clutch or brake system can be used in a vehicle, such as a bicycle or car, a windmill, or the like. The clutch or brake system has an input, e.g. arranged for connection to a drive source, and an output, e.g. arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The clutch or brake system includes a first, e.g. rotatable, unit, e.g. a housing, connectable to the input or output. The clutch or brake system includes a second, e.g. rotatable, unit connectable to the output or input, respectively. The clutch or brake system includes a third, e.g. rotatable, unit arranged for co-rotating with the second unit. The third unit is arranged for selectively being in a first mode, e.g. rotational position, or a second mode, e.g. rotational position, relative to the second unit. The system is arranged for selectively in the first mode rotationally coupling the second unit to the first unit, and in the second mode decoupling the second unit from the first unit. The third unit includes at least one, e.g. as at least two, actuation member arranged for bringing, e.g. moving, the third unit from a mode (e.g. the first position or a first position of a plurality of first positions) to a second mode (e.g. the second position or a second position of a plurality of second positions) or from a second mode (e.g. the second position or a second position of the plurality of second positions) to a first mode (e.g. the first position or a first position of the plurality of first positions) relative to the second unit. The clutch or brake system includes a, e.g. non-rotatable, fourth unit. The fourth unit includes a selector. The selector is arranged for selectively being in a gripping or non-gripping mode. The selector in the gripping mode is arranged for gripping the at least one actuation member for rotating the third unit from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second unit. The selector in the non-gripping mode is arranged for not engaging the at least one actuation member. The selector in the non-gripping mode can allow the third unit to freely rotate with the second unit.

Optionally, the first unit includes at least one first abutment surface, and the second unit includes at least one second abutment surface arranged for selectively engaging the first abutment surface. The third unit includes at least one retaining member arranged for in a first position locking the at least one second abutment surface in engagement with the at least one first abutment surface for rotationally coupling the second unit to the first unit, and in a second position releasing the at least one second abutment surface for disengagement of the at least one first abutment surface for decoupling the second unit from the first unit. Optionally, the actuation member is biased into contact with the selector, e.g. by spring force.

Optionally, the third unit includes a first body and a second body, wherein the first body includes the at least one retaining member, and the second body includes the at least one actuation member. Optionally, the third unit includes at least two actuation members, and the second body includes at least one of the actuation members, e.g. all of the actuation members.

Optionally, the first body is rotationally resiliently coupled to the second body, e.g. by means of a spring.

Optionally, the second rotatable unit includes a retractor member arranged for moving the at least one actuation member out of engagement with the selector.

Optionally, the selector includes a groove including a first partial groove and a second partial groove. In gripping mode the partial grooves allow, e.g. align for, engaging the at least one actuation member. In non-gripping mode the partial grooves allow, e.g. are out of alignment for, preventing engagement of the at least one actuation member.

Optionally, the third rotatable body includes two actuation members, optionally arranged such that when the first actuation member is biased into contact with the selector, the second actuation member is maintained at a distance from, e.g. non-engaged by, the selector and vice versa. Optionally, the selector is arranged to be in a first mode or in a second mode. In the first mode the selector is in gripping mode for the first actuation member and in non-gripping mode for the second actuation member. In the second mode the selector is in non-gripping mode for the first actuation member and in gripping mode for the second actuation member.

Optionally, the selector includes a groove including a first partial groove, a second partial groove and a third partial groove. In the first mode the first and second partial grooves allow, e.g. align for, gripping the first actuation member and optionally for not engaging the second actuation member, and in the second mode the second and third grooves allow, e.g. align for, gripping the second actuation member and optionally for not engaging the first actuation member.

Optionally, the first partial groove, the second partial groove and the third partial groove extend on a cylindrical surface of the fourth unit in a direction substantially parallel to an axis of the cylindrical surface.

Optionally, the second partial groove and the third partial groove are arranged to be moved, e.g. relative to the first partial groove, e.g. displaced tangentially. Optionally, the second and third partial groove are arranged to be moved, e.g. simultaneously, in opposite directions.

Optionally, the second partial groove is arranged for moving in the same direction as the first actuation member when the second partial groove moves from the non-gripping mode to the gripping mode for the first actuation member, and the third partial groove is arranged for moving in the same direction as the second actuation member when the third partial groove moves from the non-gripping mode to the gripping mode for the second actuation member. Hence, forces on the selector are minimized, and symmetrical for both actuation members.

Optionally, the at least one second abutment surface is a gripping member arranged for radially moving, e.g. pivoting, in and out of engagement with the at least one first abutment surface.

Optionally, the at least one actuation member is arranged for radially moving, e.g. pivoting, in and out of engagement with the fourth unit.

Optionally, the first and/or second abutment surface is biased to disengage. Hence the default for the first and second abutment surfaces is a disengaged mode. The relative position of the third and second rotatable units then determined whether or not the first and second abutment surfaces are engaged or disengaged.

Optionally, the clutch or brake system includes a plurality of first and/or second abutment surfaces, e.g. distributed along a perimeter of the first and/or second units, respectively. Optionally, the first and/or second abutment surfaces are distributed substantially uniformly along the perimeter of the first and/or second units, respectively. Optionally the number of first abutment surfaces is equal to the number of second abutment surfaces.

Optionally, the clutch or brake system includes a plurality of retaining members.

Optionally, the first, second, third, and/or fourth unit are coaxial. Optionally, the fourth unit is positioned at least partially within the third unit, and/or the third unit is at least partially positioned within the second unit, and/or the second unit is at least partially positioned within the first unit.

According to an aspect is provided a torque transmission, including a clutch or brake system as described herein and a planetary gear. The clutch or brake system can be arranged in the torque transmission so as to selectively couple two of the sun gear, the planet carrier and the ring gear of the planetary gear. Optionally, The clutch or brake system is arranged in the torque transmission so as to selectively couple the planet carrier and the ring gear.

According to an aspect is provided a wheel axle assembly, such as a bicycle wheel axle assembly, including the torque transmission. The wheel axle assembly can be arranged for receiving a cassette having a plurality of gear wheels.

According to an aspect is provided a bicycle wheel hub including a clutch or brake system as described herein. The bicycle wheel hub can include a torque transmission, as described. Optionally, the wheel hub is arranged for receiving a cassette having a plurality of gear wheels.

According to an aspect is provided a bicycle including a clutch or brake system as described herein. The bicycle can include a torque transmission, including a clutch or brake system as described herein and a planetary gear. The clutch or brake system can be arranged in the torque transmission so as to selectively couple two of the sun gear, the planet carrier and the ring gear. Optionally, The clutch or brake system is arranged in the torque transmission so as to selectively couple the planet carrier and the ring gear. Optionally, the torque transmission is included in a rear wheel hub of the bicycle. Optionally, a rear cassette having a plurality of gear wheels is attached to the rear wheel hub. The bicycle can include a rear derailleur for selecting one of the plurality of gear wheels of the rear pinion. Optionally, the bicycle includes one single front pinion. In such case, the torque transmission can emulate functioning of a front derailleur.

According to an aspect is provided a method for operating a clutch or brake system for a torque transmission. Such method can be practiced in a vehicle, such as a bicycle or car, a windmill or the like. The clutch system has an input, e.g. arranged for connection to a drive source, and an output, e.g. arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The method includes providing a clutch or brake system. The clutch or brake system includes a first, e.g. rotatable, unit, e.g. a housing, connectable to the input or the output. The clutch or brake system includes a second, e.g. rotatable, unit connectable to the output or the input. It is also possible that the first unit is connectable to the output and the second unit is connectable to the input. The first unit includes at least one first abutment surface. The second unit includes at least one second abutment surface arranged for selectively engaging the first abutment surface. The first and second abutment surfaces are adapted to each other so as to allow disengaging under load, e.g. so as to disengage under load. The clutch system includes a third, e.g. rotatable, unit. The third unit can be arranged for co-rotating with the second unit. The third unit includes at least one retaining member. The third unit is arranged for selectively being in a first mode, e.g. a first position, or a second mode, e.g. a second position, relative to the second unit. It will be appreciated that the first position can be a first rotational and/or axial position, and the second position can be a second, different, rotational and/or axial position. The third unit in the first mode locks the at least one second abutment surface in engagement with the at least one first abutment surface for rotationally coupling the second unit to the first unit. The third unit in the second mode releases the at least one second abutment surface for disengagement of the at least one first abutment surface for decoupling the second unit from the first unit. The method includes bringing, e.g. rotating, the third unit relative to the second unit from a first mode to a second mode for disengaging the clutch or brake system, and bringing, e.g. rotating, the third unit relative to the second unit from a second mode to a first mode for engaging the clutch or brake system.

Optionally, the method includes having the third unit co-rotate with the second unit, and temporarily changing rotation speed of the third unit relative to the second unit, e.g. by temporarily speeding up, braking or halting the second and/or third unit, for rotating the third unit from the first position to the second position, or from the second position to the first position, relative to the second unit.

Optionally, the method includes automatically resuming co-rotation of the third unit with the second unit after the third unit has been rotated from the first rotational position to the second rotational position or vice versa.

According to an aspect is provided a method for operating a clutch or brake system for a torque transmission. Such method can be practiced in a vehicle, such as a bicycle or car, a windmill or the like. The clutch or brake system has an input arranged for connection to a drive source, and an output arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The method includes providing a clutch or brake system. The clutch or brake system includes a first, e.g. rotatable, unit, e.g. a housing, connectable to the input or output. The clutch or brake system includes a second, e.g. rotatable, unit connectable to the output or input. The clutch or brake system includes a third, e.g. rotatable, unit arranged for co-rotating with the second unit. The third unit is arranged for selectively being in a first mode, e.g. a first rotational positon, or a second mode, e.g. a second rotational position, relative to the second unit. The system is arranged for selectively in the first mode rotationally coupling the second unit to the first unit, and in the second mode decoupling the second unit from the first unit. The method includes temporarily changing rotation speed of the third unit relative to the second unit, e.g. by temporarily speeding up, braking or halting the second and/or third unit, for bringing the third unit from the first mode to the second mode, or from the second mode to the first mode, relative to the second unit.

Optionally, the method includes rotating the third unit from the first position to the second position and from the second position to the first position in one and the same rotational direction.

Optionally, third unit includes at least one, such as at least two, actuation member arranged for moving the third unit from the first position to the second position or from the second position to the first position relative to the second unit, and the clutch or brake system includes a, e.g. non-rotatable, fourth unit including a selector, the selector being arranged for selectively being in a gripping or non-gripping mode, and the method includes with the selector in the gripping mode gripping the at least one actuation member for rotating the third unit from the first mode to the second mode or from the second mode to the first mode relative to the second unit, and with the selector in the non-gripping mode not engaging the at least one actuation member. The selector in the non-gripping mode can allowing the third unit to freely rotate with the second unit.

According to an aspect is provided a method for operating a clutch or brake system for a torque transmission. Such method can be practiced in a vehicle, such as a bicycle or car, a windmill or the like. The clutch or brake system has an input arranged for connection to a drive source, and an output arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The method includes providing a clutch or brake system. The clutch or brake system includes a first, e.g. rotatable, unit, e.g. a housing, connectable to the input. The clutch or brake system includes a second, e.g. rotatable, unit connectable to the output. It is also possible that the first unit is connectable to the output and the second unit is connectable to the input. The clutch or brake system includes a third, e.g. rotatable, unit arranged for co-rotating with the second unit. The third unit is arranged for selectively being in a first mode, e.g. a first rotational positon, or a second mode, e.g. a second rotational position, relative to the second unit. The system is arranged for selectively in the first mode rotationally coupling the second unit to the first unit, and in the second mode decoupling the second unit from the first unit. The third unit includes at least one, e.g. as at least two, actuation member arranged for bringing, e.g. moving, the third unit from a first mode, such as a first position (e.g. the first position or a first position of a plurality of first positions), to a second mode, such as a second position (e.g. the second position or a second position of a plurality of second positions), or from a second mode, such as a second position (e.g. the second position or a second position of the plurality of second positions), to a first mode, such as a first position (e.g. the first position or a first position of the plurality of first positions), relative to the second unit. The clutch or brake system includes a, e.g. non-rotatable, fourth unit. The fourth unit includes a selector. The selector is arranged for selectively being in a gripping or non-gripping mode. The method includes with the selector in the gripping mode gripping the at least one actuation member for bringing, e.g. rotating, the third unit from a first mode, such as a first position (e.g. the first position or a first position of the plurality of first positions), to a second mode, such as a second position (e.g. the second position or a second position of the plurality of second positions), or from a second mode, such as a second position (e.g. the second position or a second position of the plurality of second positions), to a first mode, such as a first position (e.g. the first position or a first position of the plurality of first positions), relative to the second unit; and with the selector in the non-gripping mode not engaging the at least one actuation member. The selector in the non-gripping mode can allow the third unit to freely rotate with the second unit.

Optionally, the first unit includes at least one first abutment surface, and the second unit includes at least one second abutment surface arranged for selectively engaging the first abutment surface, and the third unit includes at least one retaining member, and the method includes in the first position locking the at least one second abutment surface in engagement with the at least one first abutment surface for rotationally coupling the second unit to the first unit, and in the second position releasing the at least one second abutment surface for disengagement of the at least one first abutment surface for decoupling the second unit from the first unit.

Optionally, the actuation member is biased into contact with the selector.

Optionally, the method includes, e.g. actively, moving the at least one actuation member out of engagement with the selector after the third unit has been rotated from the first position to the second position, or from the second position to the first position.

Optionally, the selector includes a groove including a first partial groove and a second partial groove, and the method includes in gripping mode allowing, e.g. aligning, the partial grooves to engage the at least one actuation member, and in non-gripping mode allowing, e.g. dis-aligning, the partial grooves to prevent engagement of the at least one actuation member.

Optionally, the third unit includes two actuation members, optionally arranged such that when the first actuation member is in contact with the selector, the second actuation member maintained at a distance from the selector and vice versa, and the method includes selectively setting the selector in a first mode or in a second mode, wherein in the first mode the selector is in gripping mode for the first actuation member and in non-gripping mode for the second actuation member, and in the second mode the selector is in non-gripping mode for the first actuation member and in gripping mode for the second actuation member.

Optionally, the selector includes a groove including a first partial groove, a second partial groove and a third partial groove, wherein in the first mode the first and second partial grooves allow, e.g. align for, gripping the first actuation member and optionally not engaging the second actuation member, and in the second mode the second and third grooves allow, e.g. align for, gripping the second actuation member and optionally not engaging the first actuation member.

Optionally, the method includes moving the second and third partial grooves, e.g. simultaneously, in opposite directions.

Optionally, the method includes moving the second partial groove in the same direction as the first actuation member when the second partial groove moves from the non-gripping mode to the gripping mode for the first actuation member, and moving the third partial groove in the same direction as the second actuation member when the third partial groove moves from the non-gripping mode to the gripping mode for the second actuation member.

It will be appreciated that any one or more of the above aspects, features and options can be combined. It will be appreciated that any one of the options described in view of one of the aspects can be applied equally to any of the other aspects. It will also be clear that all aspects, features and options described in view of the clutch or brake system apply equally to the transmission system, axle assembly, wheel assembly, bicycle, method, and vice versa.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
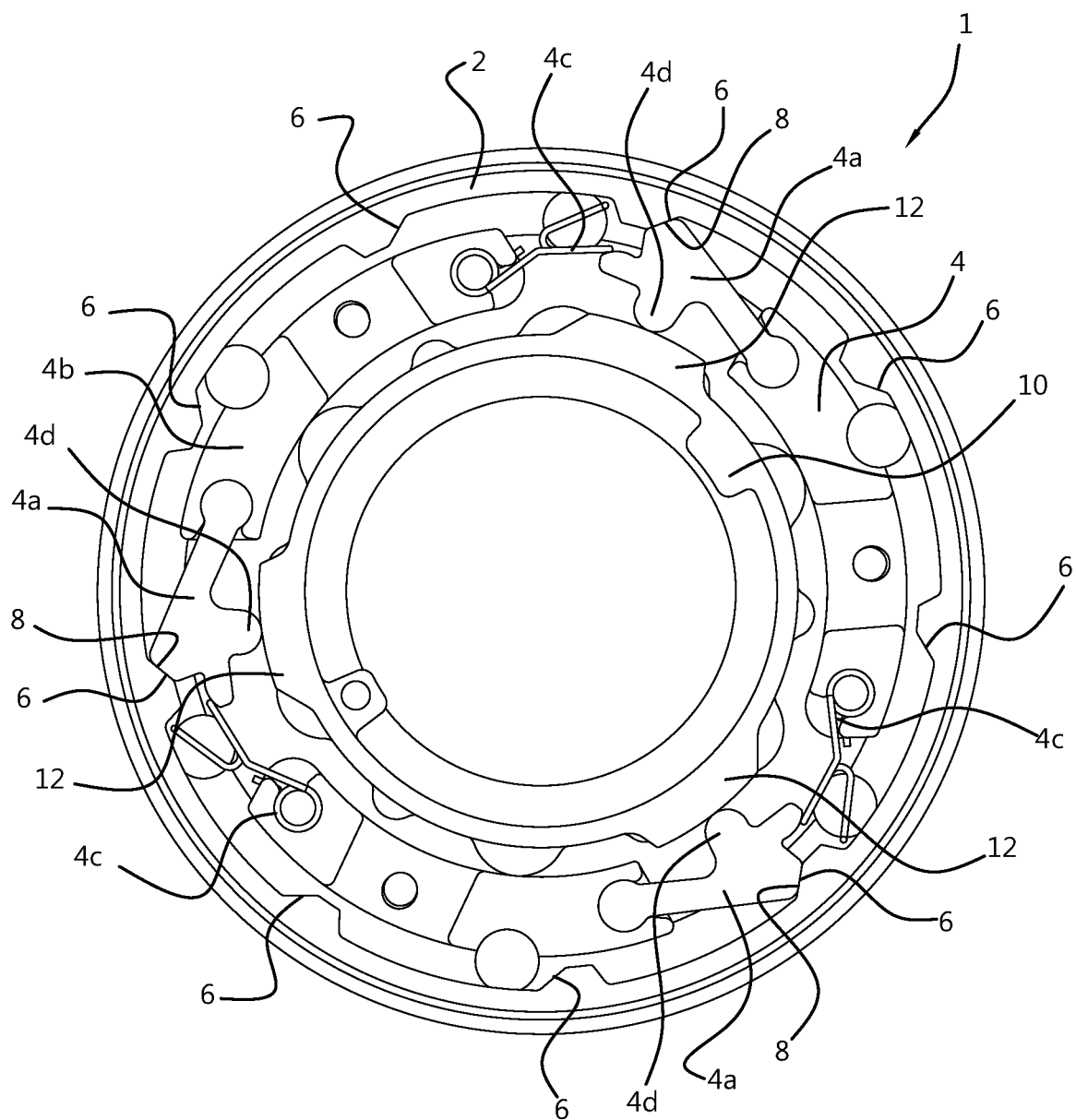
FIG. 1 shows an example of a clutch or brake system.
Figure 13:
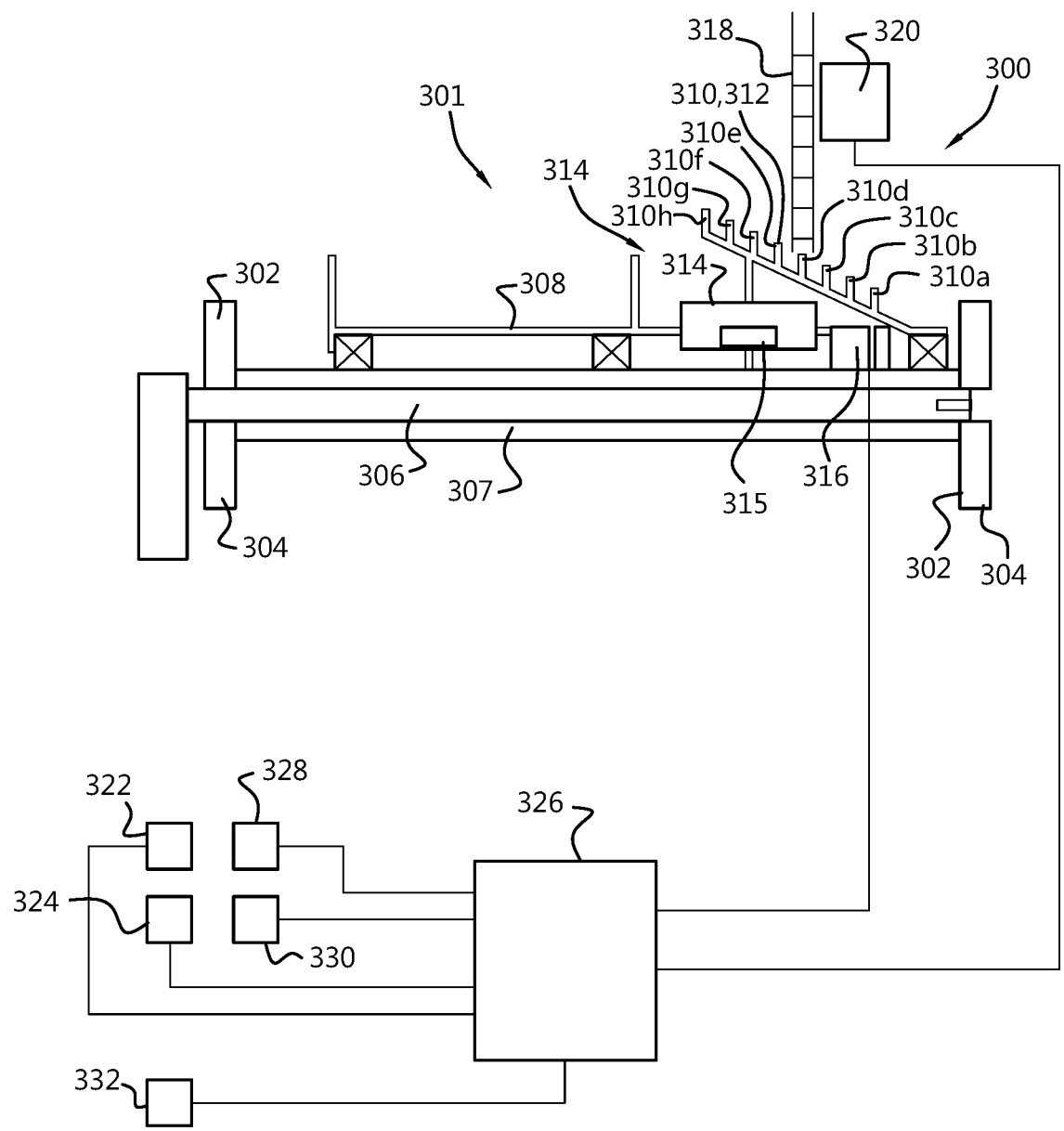
FIG. 13 shows an example of a transmission system.

FIG. 13 shows a schematic cross section of a transmission system 300, such as for a two wheeled bicycle, including a wheel axle assembly 301. In FIG. 1 the wheel axle assembly 301 is mounted in a frame 302 of a bicycle. Here, the wheel axle assembly 301 is mounted between two dropouts 304 of the frame 302. In this example, the wheel axle assembly includes a thru-axle 306 for securing the wheel axle assembly 301 to the frame 302. The thru-axle 306 here is inserted through the hollow axle 307. The wheel axle assembly includes a hub 308. The wheel axle assembly includes a driver set of sprockets 310 for driving the hub in rotation. Here the set of sprockets 310 is embodied as a cassette 312 including a plurality of sprocket gears 310a-310h. In this example, the sprockets 310a-310h increase in size from one sprocket to the next. The number of teeth of the sprockets 310a-310h thus increases from one sprocket to the next.

In this example, the set of sprockets 310 is connected to the hub 308 via a transmission unit 313. The transmission unit 313 includes a transmission 314 and a clutch or brake system 315. The transmission 313 is arranged to selectively be in a first mode and in a second mode. A first transmission ratio of the transmission 314 in the first mode is different from a second transmission ratio in the second mode. Here, in the first mode the first transmission ratio is unity (output rotation speed at the hub equals input rotation speed at the driver). Here, in the second mode the second transmission ratio is a speed reduction (output rotation speed at the hub is smaller than the input rotation speed at the driver). Hence, the transmission can e.g. mimic the functioning of a front derailleur.

In this example, the transmission 314 is embodied as a planetary gear set. The clutch or brake system 315 is arranged for selectively braking, coupling one of the rotary elements of the planetary gear set to the non-rotating axle 307, thus selectively bringing the transmission unit 313 in the first mode or in the second mode. In FIG. 1 the wheel axle assembly 301 includes an first, in this example electric, actuator 316 arranged for actuating the transmission unit 313 to switch from the first mode to the second mode and vice versa. The actuator 316 can e.g. include a processor and a motor. Here, the first actuator selectively actuates the clutch or brake system 314 for coupling or decoupling, i.e. for braking or for not braking the rotary element of the planetary gear set.

It is also possible that the transmission 314 is embodied as a continuously variable transmission. The continuously variable transmission can be arranged to selectively be in a first mode and in a second mode. A first transmission ratio of the continuously variable transmission in the first mode is different from a second transmission ratio in the second mode. that is used to switch, or shift, from the first to the second transmission ratio or vice-versa. While switching from the first to the second transmission ratio or vice-versa, the continuously variable transmission can traverse all (continuous) intermediate transmission ratios. The continuously variable transmission can also used to switch from the first to a second and to a third transmission ratio or vice-versa.

The first and the second, and possibly the third, transmission ratio can be chosen by the controller and possibly preprogrammed by the user. The user can e.g. select desired transmission ratios and set these in the controller. Thereto, the controller can include a user interface. It is also possible that the transmission ratios are selected on a communications device, such as a smartphone or tablet, and communicated to the controller. A computer program product, such as an app, can thereto be executed on the communications device.

The transmission ratio(s) can be chosen by the controller and can be adapted depending on the sprocket that is engaged with the chain. It is also possible that the user preprograms transmission ratios depending on the sprocket that can be engaged with the chain.

Optionally, the transmission unit has an input coupled to the set of sprockets and an output arranged to be coupled to a wheel. Alternatively, the transmission unit can have an input coupled to the system input and an output arranged to be coupled to the chain ring.

In FIG. 1 the transmission system further includes a chain 318 for driving one of the sprockets in rotation. The transmission system 300 also includes a second actuator 320 for selecting one of the sprockets for transmission of torque to the axle assembly. The second actuator can e.g. be a rear derailleur, or an electric actuator associated with a rear derailleur.

In this example, the transmission system 300 further includes a first shift signal generator 322, such as a first switch or button, and a second shift signal generator 324, such as a second switch or button. The transmission system 300 further includes a controller 326 configured to receive a first shift signal, from the first shift signal generator 322, and a second shift signal, from the second shift signal generator 324. The controller 326 is communicatively connected, e.g. wired or wirelessly, to the first and second shift signal generators 322, 324, and to the first and second actuators, 316, 320. The controller is configured to control the first actuator and/or the second actuator in response to the first or second shift signal In a first example, the first shift signal is an upshift signal and the second shift signal is a downshift signal. The controller is configured to selectively control the first and/or second actuator for selecting the next higher transmission ratio in response to receiving the upshift signal, and for selecting the next lower transmission ratio in response to receiving the downshift signal. Hence, the rider only needs to provide the upshift signal or the downshift signal by means of the first or second shift signal generators 322, 324. The controller then controls the first and second actuators 316, 320 in response to the upshift or downshift signal provided by the rider. Depending on the transmission ratio used at that point in time, the next higher transmission ratio can be achieved by actuating the first actuator and/or the second actuator. The controller is configured to select and actuate the appropriate actuator. Thus, simple shifting is provided to the rider.

In this example, the number of teeth of the sprockets 310a-310h increases from one sprocket to the next. Conventionally, the transmission ratio, and thus the number of teeth of the sprocket, differs by 8-10% from one sprocket to the next. Here, the number of teeth of the sprockets differs by more percents than is conventional from one sprocket to the next. The first and second transmission ratios of the transmission differ by less than the percentage of difference between the consecutive sprockets. Thus, the transmission unit 313 can provide an intermediate transmission ratio between the transmission ratios provided by two sprockets. In an embodiment, the first and second transmission ratios of the transmission differ by about half the percentage of difference between the consecutive sprockets. For example, the percentage P of difference between the first and second transmission ratios is chosen to be $$P = 100\left(\sqrt{\frac{100+Q}{100}} - 1\right)$$

where Q is the percentage of difference between the consecutive sprockets.

Since the sprockets have an integral number of teeth, it will be appreciated that the percentual difference of the number of teeth between two consecutive sprockets can vary somewhat from sprocket to sprocket. The percentage of difference between the first and second transmission ratios can e.g. be chosen to be about half an average percentual difference of the number of teeth between two consecutive sprockets calculated over all sprockets of the set.

Generally, two consecutive sprockets have a number of teeth differing by 10-30 percent, preferably by 12-25 percent, more preferably by 14-20 percent, and the first and second transmission ratios of the transmission differ by less than 5-20 percent, preferably by less than 6-15 percent, more preferably by less than 7-11 percent. The same can generally apply for each pair of consecutive sprockets or for all pairs of consecutive sprockets. Generally, on average, all pairs of consecutive sprockets can have their number of teeth differing by a predetermined percentage, and the first and second transmission ratios of the transmission differ by less than the predetermined percentage, such by about half the predetermined percentage.

In this example, the transmission unit 313 provides an intermediate transmission ratio between all shifts from one sprocket to the next. Therefore, in this example, the controller can be configured to in response to repeated upshift signals a) shift up the transmission unit from the second transmission ratio to the first transmission ratio, b) shift up to the next sprocket and simultaneously shift down the transmission unit from the first transmission ratio to the second transmission ratio, and c) repeat steps a) and b). It will be appreciated that downshifting can be performed in the reverse order.

In the example of FIG. 1, the transmission system 300 includes an optional bail-out signal generator 332. If the controller 326 receives the bail-out signal from the bail-out signal generator, the controller actuates the first and or second actuators 316, 320 to achieve a downshifting of multiple steps at once. Such multiple step downshifting can e.g. be a reduction in transmission ratio of 20-60 percent, e.g. 20-35 percent. It will be appreciated that the bail-out signal can also be generated in other ways, such as by long pressing downshift button, double-clicking a downshift button, pressing upshift and downshift buttons simultaneously or in closely timed relation, or the like.

Optionally, the transmission system 300 further includes a third shift signal generator 328, such as a third switch or button, and a fourth shift signal generator 330, such as a fourth switch or button. The controller 326 can then be configured to receive a third shift signal, from the third shift signal generator 328, and a fourth shift signal, from the fourth shift signal generator 330. The controller 326 is then communicatively connected, e.g. wired or wirelessly, to the third and fourth shift signal generators 328, 330. The controller is configured to control the first actuator and/or the second actuator in response to the first or second shift signal, and optionally the third and fourth shift signal.

The first shift signal can be an upshift signal for the first actuator, the second shift signal can be a downshift signal for the first actuator, the third shift signal can be an upshift signal for the second actuator, and the fourth shift signal can be a downshift signal for the second actuator. The controller can be configured to control the first actuator on the basis of the first and second shift signals, and to control the second actuator on the basis of the third and fourth shift signals.

In a second example, the first transmission ratio and the second transmission ratio of the transmission unit 313 differ by about 30-40 percent. This way, the transmission unit 313 more closely mimics the operation of a front derailleur. Especially in combination with the first, second, third and fourth shift signal generators, the feel of front and rear derailleurs can be provided to the rider. An important difference to actual front and rear derailleur operation can be that the transmission system 300 can be operated to shift transmission ratio under load.

Figure 2:
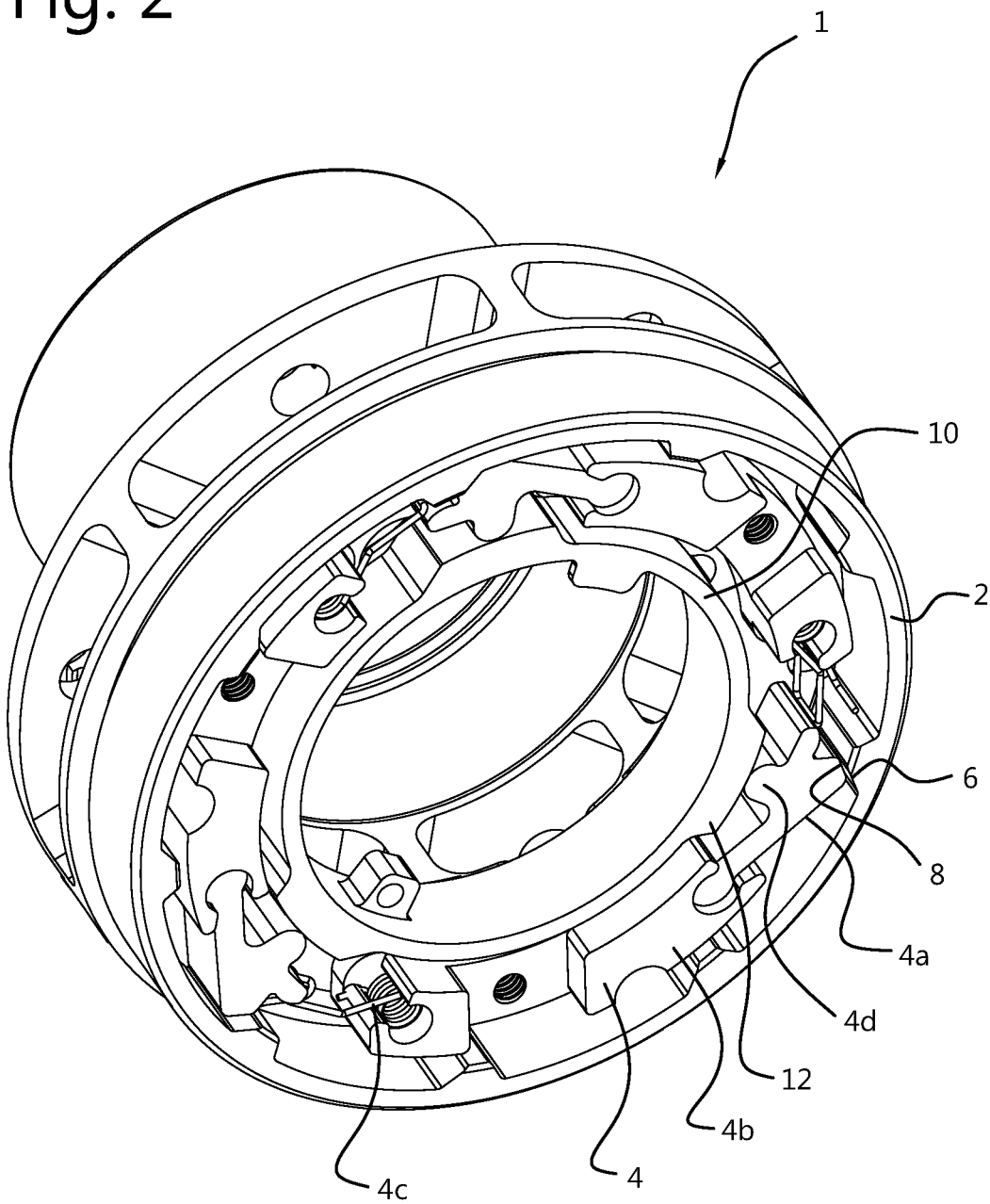
FIG. 2 shows an example of a clutch or brake system.
Figure 3:
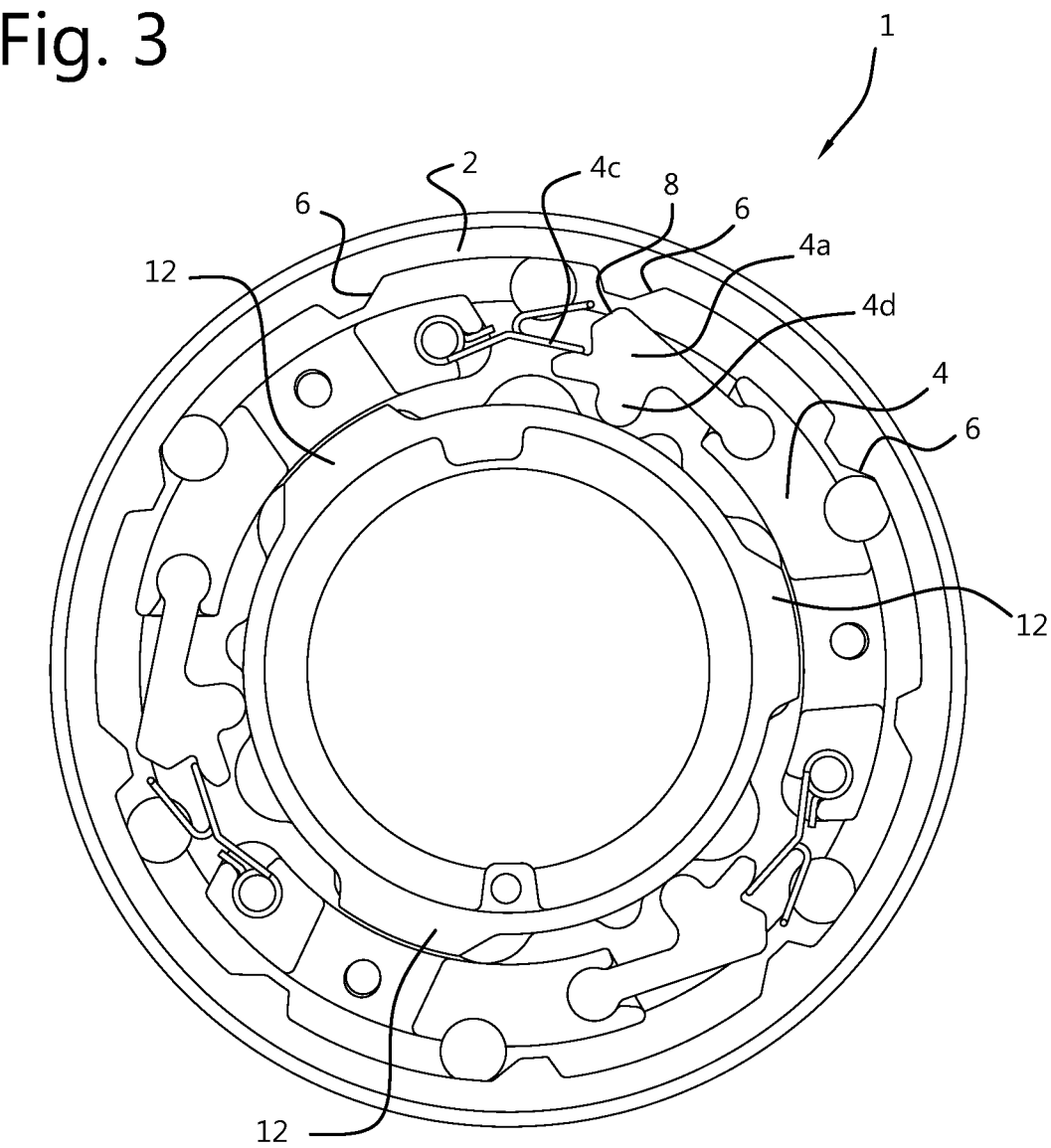
FIG. 3 shows an example of a clutch or brake system.

FIGS. 1, 2 and 3 show an example of a clutch system 1. The clutch system 1 of this example is for use in a torque transmission of a bicycle, however, other fields of use can be envisioned. The clutch or brake system 1 can be used as clutch or brake system 316 in the transmission system 300 as described in view of FIG. 13. The clutch system 1 has an input arranged for connection to a drive source, such as pedals or a chain/belt. The clutch system has an output arranged for connection to a load, such as a rear wheel hub. The exemplary clutch system 1 is operable under load between the input and the output, e.g. while pedaling. Hence, the clutch system 1 can be coupled or decoupled under load. Here, the clutch system is operable under load between the input and the output both during upshift and downshift of the torque transmission.

The clutch system in FIGS. 1, 2 and 3 includes a first, in this example rotatable, unit 2. The first rotatable unit 2 is arranged to be connected to the input. Here, the first rotatable unit 2 is designed as a housing part of the clutch system 1. The clutch system 1 includes a second, in this example rotatable, unit 4. The second rotatable unit 4 is arranged to be connected to the output. The first rotatable unit 2 includes at least one first abutment surface 6. In this example, the first rotatable unit 2 includes nine first abutment surfaces 6, here evenly distributed along the perimeter of the first rotatable unit 2 at 40 degrees mutual spacing. The second rotatable unit 4 includes at least one second abutment surface 8. In this example, the second rotatable unit 4 includes three second abutment surfaces 8, here evenly distributed along the perimeter of the second rotatable unit 4 at 120 degrees mutual spacing. It will be appreciated that in this example the second rotatable unit 4 includes a plurality of gripping members 4a, here embodied as separate parts hingedly connected to a body portion 4b of the second rotatable unit 4. In this example, the second abutments surfaces 8 are part of the gripping members 4a of the second rotatable unit 4. The second abutment surfaces 8, here the gripping members 4a, are each arranged for selectively engaging one of the first abutment surfaces 6. In the example of FIG. 1 it can be seen that the first and second abutment surfaces are oriented at an angle relative to a radial direction of the first and second rotatable units, respectively. This allows the first and second abutment surfaces are to disengaging under load. In this example, the second rotatable unit 4 includes resilient members 4c, here helical springs, arranged so as to bias the second abutment surfaces 8 out of engagement with the first abutment surfaces 6.

The clutch system 1 in FIGS. 1, 2 and 3 includes a third, in this example rotatable, unit 10. The third rotatable unit 10 is arranged for co-rotating with the second rotatable unit 4. That is, in use, when the output is rotating (e.g. when the driven wheel of the bicycle is rotating), i.e. when the second rotatable unit 4 is rotating, the third rotatable unit 10 generally co-rotates with the second rotatable unit 4.

The third rotatable unit 10 includes at least one retaining member 12. In this example, the third rotatable unit 10 includes three retaining members 12, here evenly distributed along the perimeter of the third rotatable unit 10 at 120 degrees mutual spacing. The third rotatable unit 10 is arranged for selectively being in a first position (see FIG. 1) or a second position (see FIG. 3) relative to the second rotatable unit 4. It will be appreciated that in this example the first position is a first rotational position, and the second position is a second, different, rotational position.

In the first position (shown in FIG. 1), the retaining members 12 are positioned rotationally aligned with, here under, cams 4d of the gripping members 4a. Thus, in the first position, the gripping members 4a are forced to be pivoted in a radially outer position. In the first position, the second abutment surfaces 8 are positioned to be touching or close to the first abutment surfaces 6. The presence of the retaining members 12 under the cams 4a prevents the second abutment surfaces from being pivoted radially inwards sufficiently to disengage from the first abutment surfaces 6. Hence, the retaining members 12 in the first position lock the second abutment surfaces 8 in engagement with the first abutment surfaces 6. As the second abutment surfaces 8 are locked in engagement with the first abutment surfaces 6, the second rotatable unit 4 is rotationally coupled to the first rotatable unit 2.

In the second position (shown in FIG. 3), the retaining members 12 are positioned rotationally not aligned with, here out of the reach of, the cams 4d of the gripping members 4a. Thus, in the second position, the gripping members 4a are free to pivot to a radially inner position. In this example, the biasing force of the resilient members 4c pivots the second abutment surfaces 8 radially inwards sufficiently to disengage from the first abutment surfaces 6. As a result, the first rotatable unit 2 is free to rotate independently of the second rotatable unit 4. Thus, the second rotatable unit 4 is decoupled from the first rotatable unit 2.

Hence, while the first abutment surfaces 6 and second abutment surfaces 8 are adapted to each other so as to allow disengaging under load, or to disengage under load, the relative positioning of the second rotatable unit 4 and the third rotatable unit 10 can selectively in the first position lock the second abutment surfaces 8 in engagement with the first abutment surfaces 6, and in the second position release the second abutment surfaces 8 for disengagement from the first abutment surfaces 6. It will be appreciated that while the first rotatable unit 2 and second rotatable unit 4 are decoupled, rotating the third rotatable unit 10 from the first position to the second position relative to the second rotatable unit 4, will couple the first and second rotatable units. While the first rotatable unit 2 and second rotatable unit 4 are coupled, rotating the third rotatable unit 10 from the second position to the first position relative to the second rotatable unit 4, will decouple the first and second rotatable units.

Changing the position of the third rotatable unit 10 relative to the second rotatable unit 4 from the first position to the second position, or vice versa, can be performed in many different ways. Changing the position of the third rotatable unit 10 relative to the second rotatable unit 4 from the first position to the second position can be performed by rotating the third rotatable unit 10 relative to the second rotatable unit 4 in a forward direction, and changing the position of the third rotatable unit 10 relative to the second rotatable unit 4 from the second position to the first position can be performed by rotating the third rotatable unit 10 relative to the second rotatable unit 4 in an opposite, rearward direction. It is also possible to rotate the third rotatable unit 10 relative to the second rotatable unit 4 from the first position to the second position, and from the second position to the first position in one and the same rotational direction.

An actuator can be provided for rotating the third rotatable unit and/or the second rotatable unit from the first position to the second position, and/or from the second position to the first position.

In the example of FIGS. 1, 2 and 3, the third rotatable unit 10 is arranged for co-rotating with the second rotatable unit 4. Therefore, changing the position of the third rotatable unit 10 relative to the second rotatable unit 4 from the first position to the second position, or vice versa, can be performed by temporarily changing rotation speed of the third rotatable unit relative to the second rotatable unit, e.g. by temporarily speeding up, braking or halting the second and/or third rotatable unit, for rotating from the first position to the second position, or from the second position to the first position.

In the example of FIGS. 1, 2 and 3, the third rotatable unit 10 is freely rotatable relative to the second rotatable unit 4. There is no limit to the rotational displacement of the third rotatable unit 10 relative to the second rotatable unit 4. In this example, the third rotatable unit 10 is arranged for selectively being in one of a plurality of first positions or one of a plurality of second positions relative to the second rotatable unit. Each of the first positions of the plurality of first positions is defined by the third rotatable unit 10 being positioned to lock the second abutment surfaces 8 in engagement with the first abutment surfaces 6 for rotationally coupling the second rotatable unit 4 to the first rotatable unit 2. In this example there are three gripping members 4a and three retaining members 12, so there are three distinct first positions. Here, the three first positions are evenly distributed along the perimeter of the second rotatable unit 4 at 120 degrees mutual spacing. Each of the second positions of the plurality of second positions is defined by the third rotatable unit 10 being positioned to release the second abutment surfaces 8 from engagement with the first abutment surfaces 6 for rotationally decoupling the second rotatable unit 4 from the first rotatable unit 2. In this example there are three gripping members 4a and three retaining members 12, so there are three second positions. Here, the three second positions can be seen as evenly distributed along the perimeter of the second rotatable unit 4 at 120 degrees mutual spacing. It will be appreciated that the three first positions and three second positions are alternatingly placed along the perimeter of the second rotatable unit 4. For example, the three first positions and three second positions are alternatingly spaced at 60 degrees around the perimeter of the second rotatable unit.

Here, the third rotatable unit 10 can be rotated relative to the second rotatable unit 4 from a first first position to a first second position, from the first second position to a second first position, from the second first position to a second second position, from the second second position to a third first position, from the third first position to a third second position, and from the third second position to the first first position in one and the same rotational direction. The clutch system 1 can be arranged for temporarily changing rotation speed of the third rotatable unit 10 relative to the second rotatable unit 4, e.g. by temporarily speeding up, braking or halting the second and/or third rotatable unit, for rotating from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions). Hence, the second and third rotatable units can in a simple manner be rotated from a first position to a second position or vice versa.

FIGS. 4a, 4b, 4c and 5 show an example of a mechanism for moving the third rotatable unit 10 from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit.

The third rotatable unit 10 includes at least one, here two, actuation member 10a arranged for moving the third rotatable unit 10 from a first position to a second position or from a second position to a first position relative to the second rotatable unit 4. The actuation members 10a are hingedly connected to a body portion 10b of the third rotatable unit 10. In this example, the body portion 10b of the third rotatable unit 10 includes an first body portion 10b1 and a second body portion 10b2. The first body portion 10b1 hingedly receives the actuation members 10a. The second body portion 10b2 includes the retaining members 12. The first body portion 10b1 is rotatable relative to the second body portion 10b2, here over an angular stroke S. The first and second body portions 10b1, 10b2 are biased in abutment with a resilient element 10c, here a tension spring. This allows the first and second body portions to rotate relative to each other. For example, when the retaining member 12 can not yet push the gripping member 4a radially outwardly in abutment with the first abutment surface 6 the resilient element 10c allows the first body portion 10b1 to rotate relative to the first rotatable unit 2 while the second body portion 10b2 does not rotate relative to the first rotatable unit 2.

In FIGS. 4a, 4b, 4c and 5 the clutch system 1 further includes a, here non-rotatable, fourth unit 16. The fourth unit 16 can be arranged to be non-rotatably mounted to a frame of the bicycle. The fourth unit 16 is further shown in FIGS. 6 and 7. The fourth unit 16 includes a selector 18. The selector 18 is arranged for selectively being in a gripping or non-gripping mode.

Figure 4A:
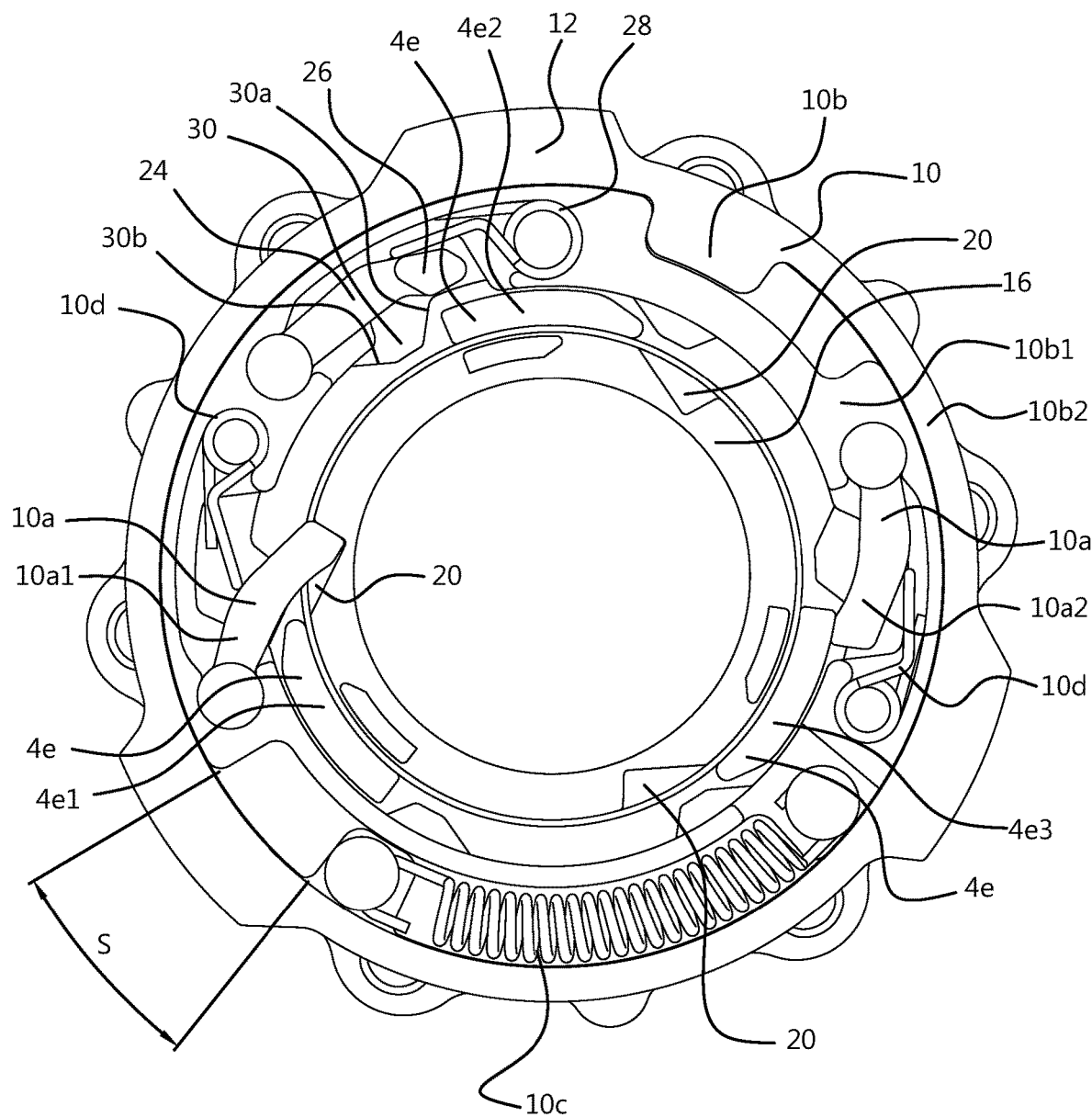
FIG. 4a, 4b and 4c show an example of a clutch or brake system.

As shown in FIGS. 4a-7, here the third rotatable body 10 includes two actuation members 10a. In this example, the actuation members 10a are biased towards the fourth unit 16 by resilient elements 10d, here helical springs. In this example, the second rotatable unit 4 includes three retractor members 4e. the retractor members 4e co-rotate with the body portion 4b of the second rotatable unit 4. The retractor members 4e can e.g. be fixedly connected to, or integral with, the body portion 4b. As can be seen in FIG. 4a, one of the retractor members 4e, here 4e1, allows a first actuation member 10a1 to engage the fourth unit 16, while another one of the retractor members 4e, here 4e3, prevents a second actuation member 10a2 to engage the fourth unit 16. Hence, when the first actuation member 10a1 is biased into contact with the selector 18, the second actuation member 10a2 is maintained at a distance from, e.g. non-engaged by, the selector 18, and vice versa.

Figure 4B:
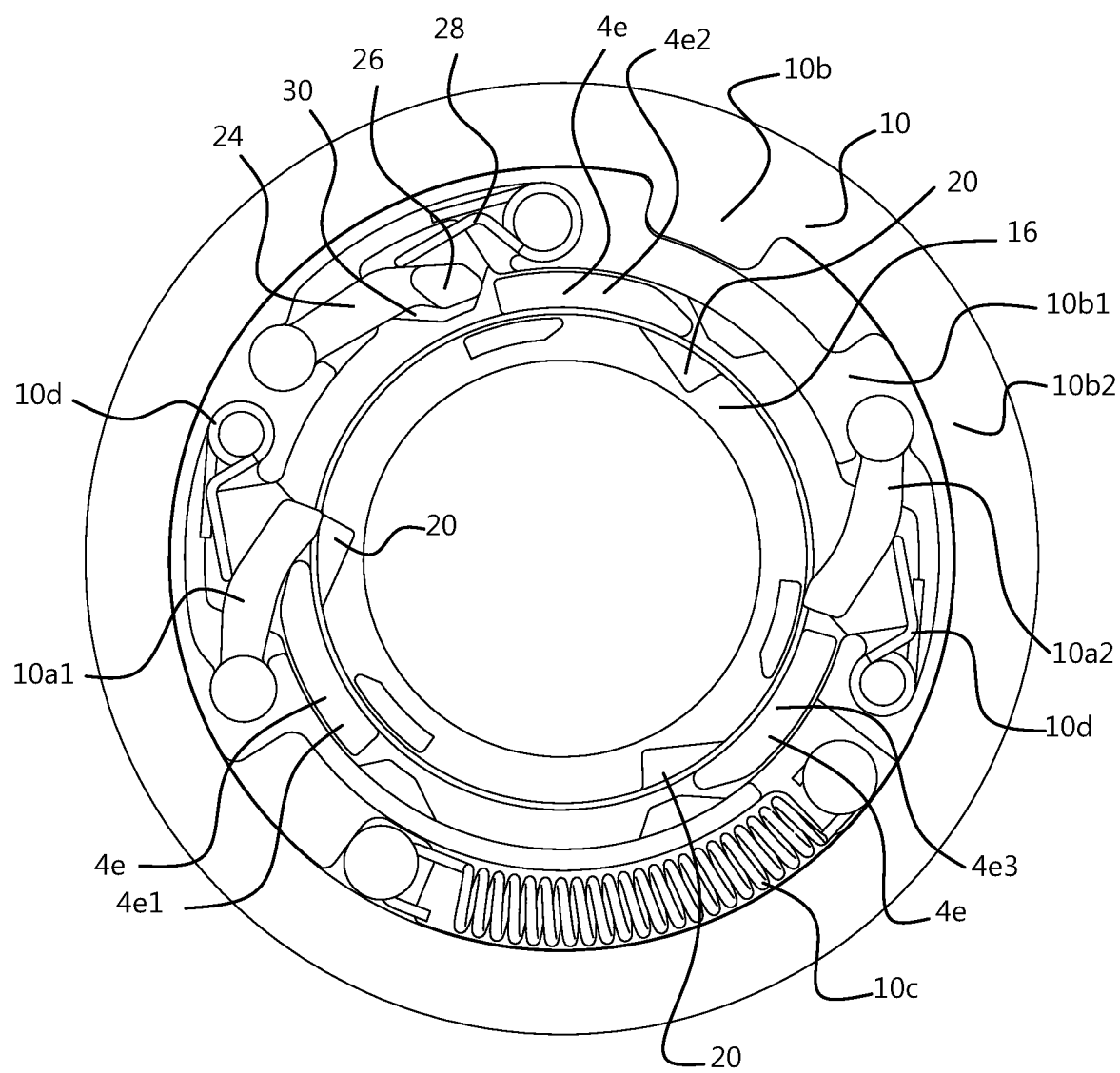
Figure 4C:
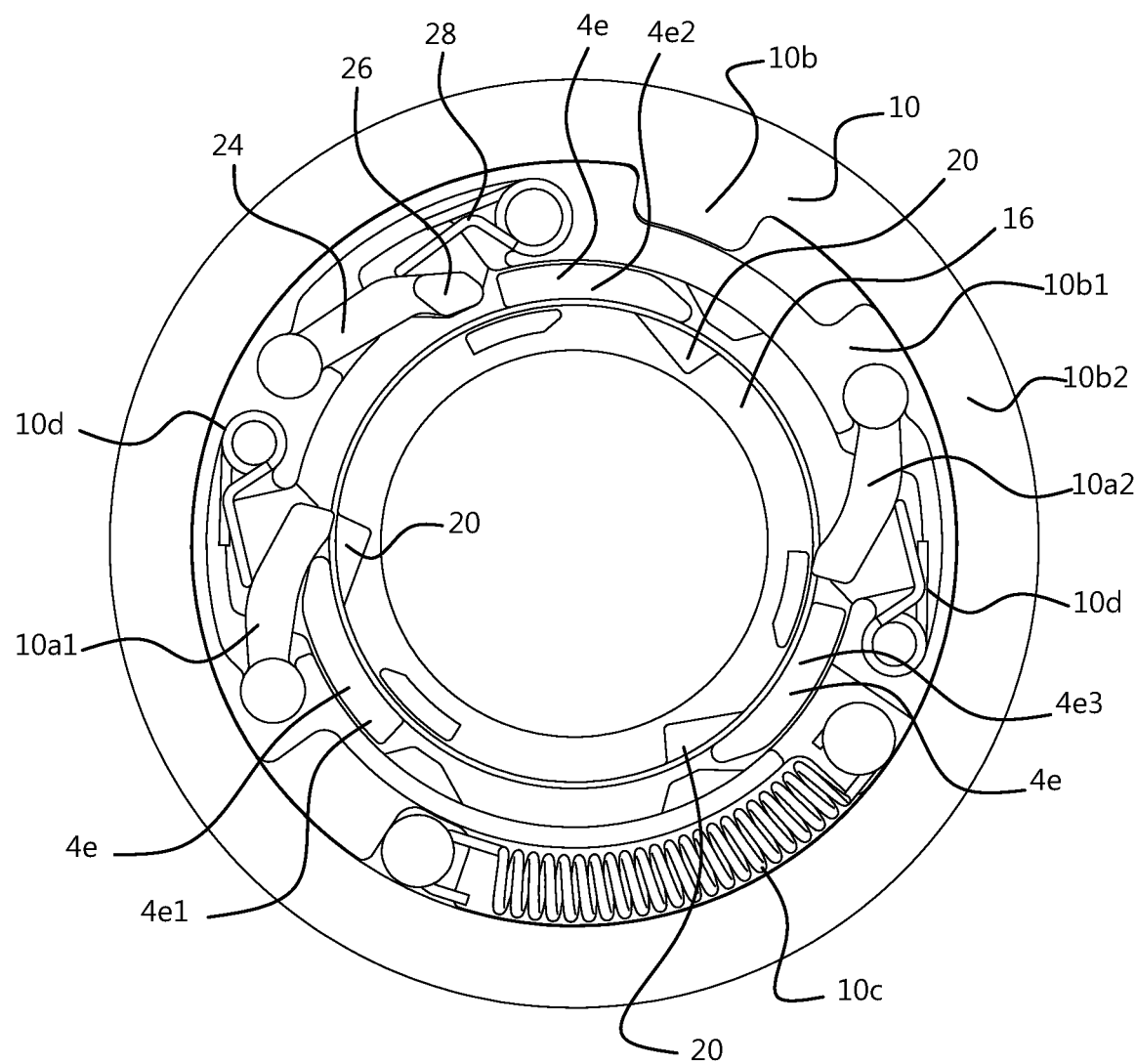
Figure 5:
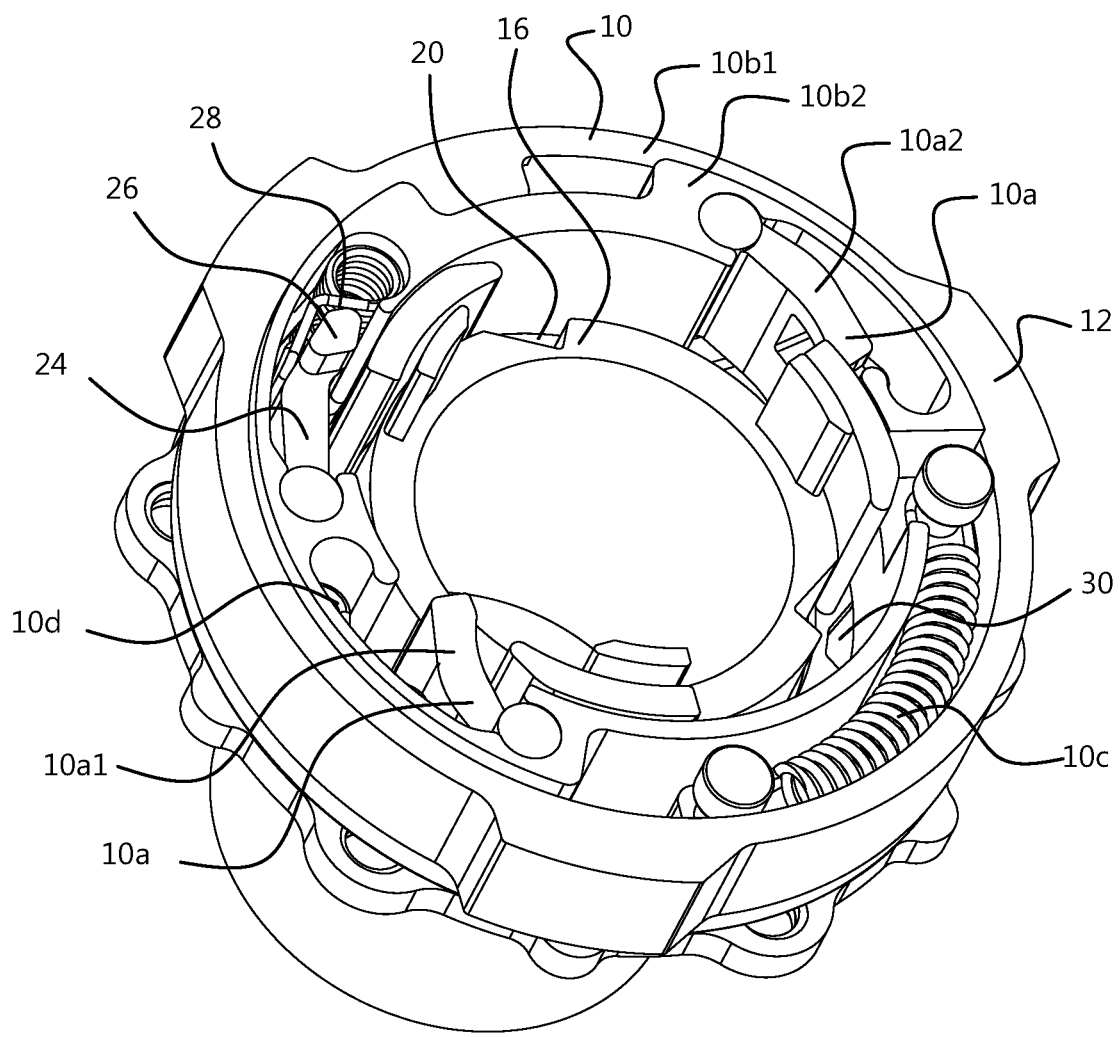
FIG. 5 shows an example of a clutch or brake system.
Figure 6:
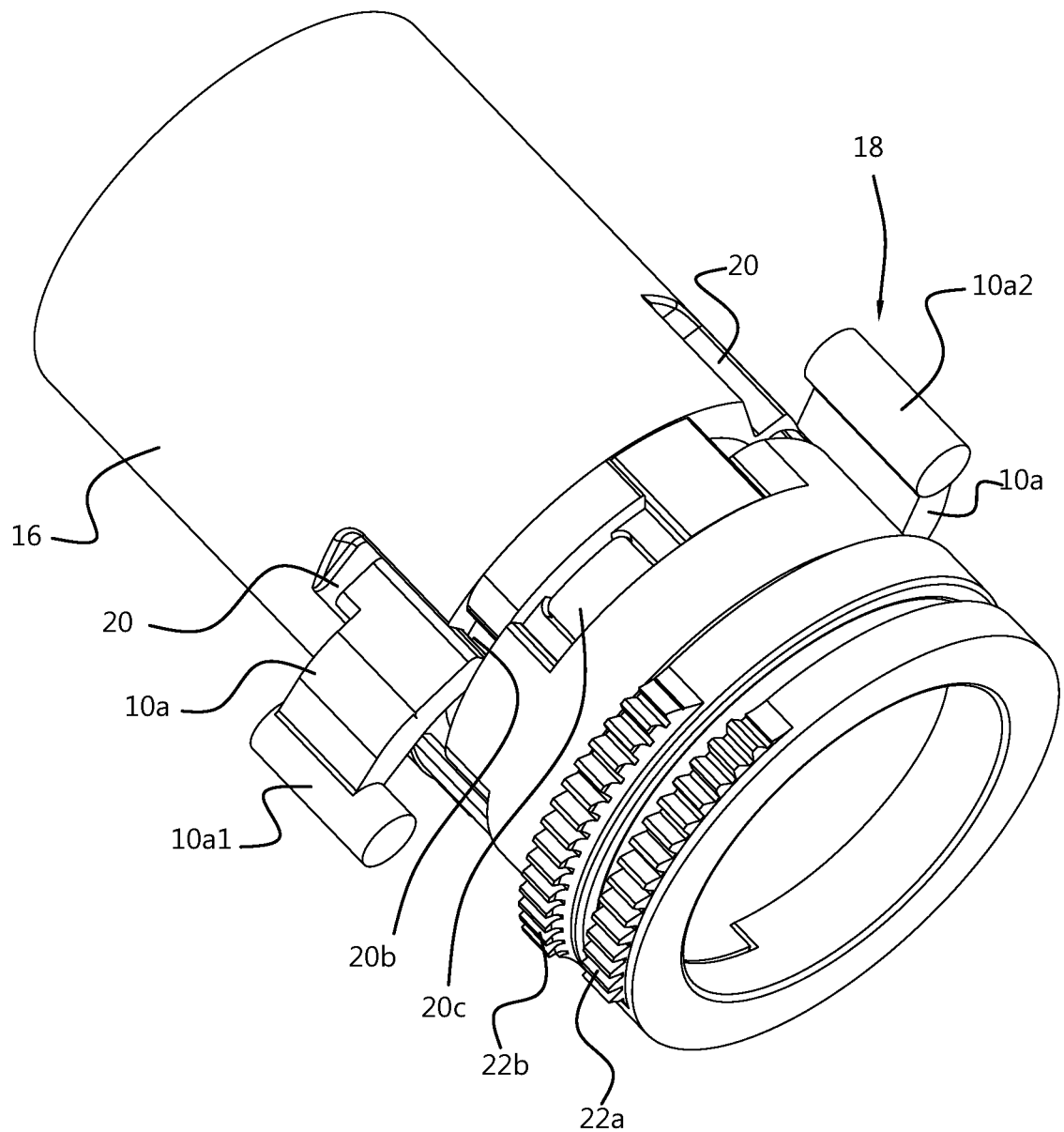
FIG. 6 shows an example of a clutch or brake system.
Figure 7:
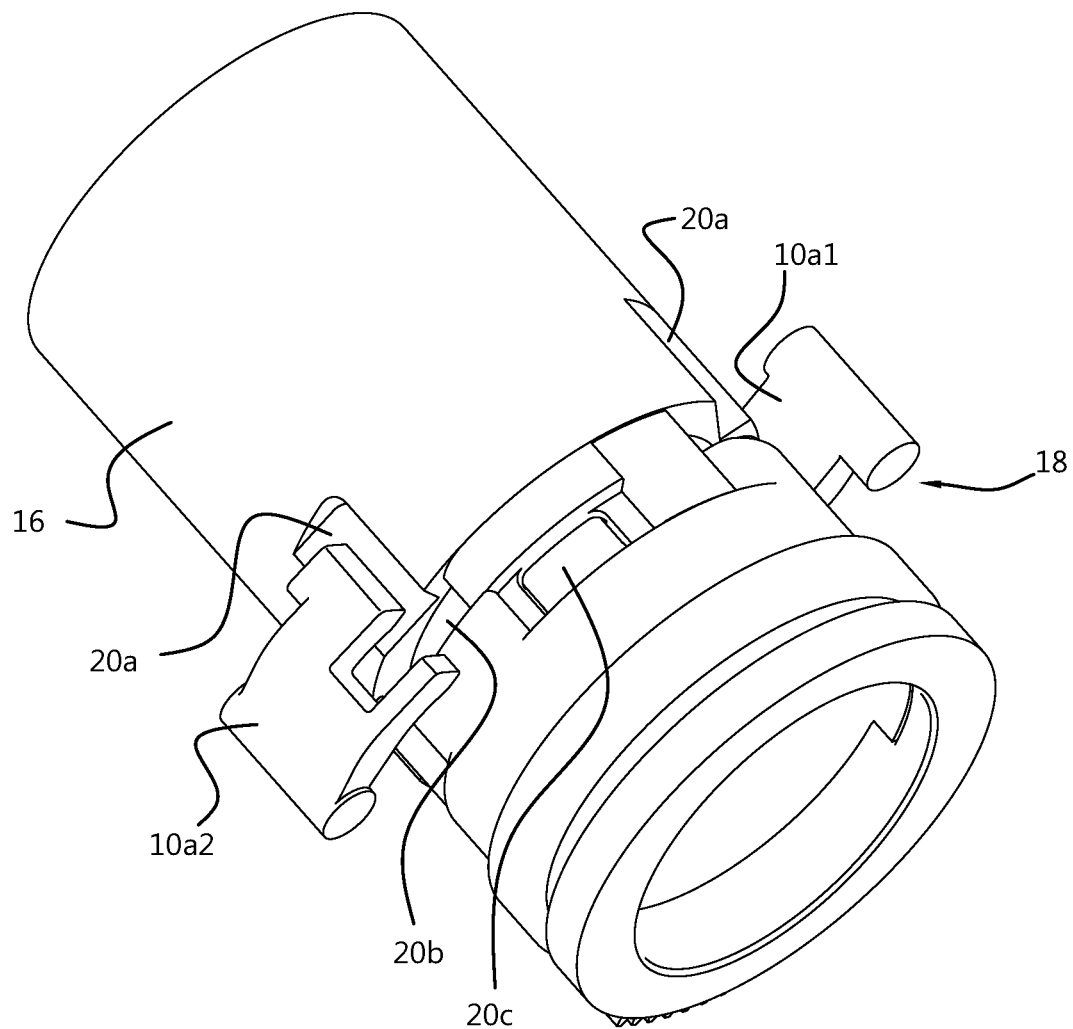
FIG. 7 shows an example of a clutch or brake system.

As shown in FIGS. 6 and 7, in this example the selector 18 includes a groove 20. In this example, the groove 20 includes a first partial groove 20a, a second partial groove 20b and a third partial groove 20c. In a first mode the first partial groove 20a and second partial groove 20b align as shown in FIGS. 6 and 7. It is noted that in this first mode the third partial groove 20c does not align with the first partial groove 20a. In a second mode the first partial groove 20a and third partial groove 20c align. It is noted that in this second mode the second partial groove 20b does not align with the first partial groove 20a. As can be seen in FIG. 6, the first and second partial grooves 20a, 20b aligning, allows the first actuation member 10a1 to enter into the first partial groove 20a, as can also be seen in FIG. 4a. It will be noted that in this example the shape of the first actuation member 10a1, requires the first partial groove 20a and the second partial groove 20b to align for allowing the first actuation member 10a1 to enter the first partial groove 20a. The first partial groove 20a then supports the first actuation member 10a1, allowing a force to be guided from the fourth unit 16 via the first actuation member 10a1 to the third rotatable unit 10. As a result, the third rotatable unit 10 will be halted, and when, in use, the second rotatable unit 4 will remain rotating, the third rotatable unit 10 will be rotated relative to the second rotatable unit 4. When the second rotatable unit 4 has rotated over approximately 60 degrees after gripping of the first actuation member 10a1 by the first partial groove 20a, the retractor member 4e1 knocks the first actuation member 10a1 out of the first partial groove 20a, as can be seen in FIGS. 4b and 4c, and the third rotatable unit 10 resumes co-rotating with the second rotatable unit 4.

In this example, the third rotatable unit 10 includes a retainer 24. In this example, the retainer 24 is hingedly connected to the body portion 10b of the third rotatable unit 10. Here, the retainer 24 includes a tooth 26. The tooth 26 is biased by a resilient element, here a spring 28. The second rotatable unit 4 includes a, here three, notch 30. Here the notch 30 has an angled face 30a. As can be seen in FIG. 4b, when the retractor member 4e1 has knocked the first actuation member 10a1 out of the first partial groove 20a the tooth 26 of the retainer 24 is on the angled face 30a of the notch 30. Due to the biasing force of the resilient element 28, the tooth 26 is pushed along the angled face 30a to the bottom of the notch 30, as can be seen in FIG. 4b. As a result, the third rotatable unit 10 assumes a defined angular position relative to the second rotatable unit 4. Also, the slight angular movement from the situation shown in FIG. 4b, with the actuation member 10a1 just freed from the groove 20, to the situation shown in FIG. 4c, enables that the retractor member 4e1 lifts the actuation member 10a1 away from the groove 20, so that mechanical contact between the actuation member 10a1 and the fourth unit 16 can be avoided.

Having been rotated over 60 degrees, the third rotatable unit 10 has been rotated from a first position to a second position, or from a second position to a first position relative to the second rotatable unit 4. Now, the first actuation member 10a1 is maintained in a non-deployed position by the retractor member 4e and is maintained at a distance from the selector 18.

At approximately the same time, the other retractor member 4e3 is also rotated and releases the second actuation member 10a2 to engage the fourth unit 16. However, as can be seen in FIG. 7, the second actuation member 10a2 cannot enter into the first partial groove 20a, as the shape of the second actuation member 10a2 requires the third partial groove 20c to align with the first partial groove 20a for allowing the second actuation member 10a2 to enter into the first partial groove 20a. The second actuation member 10a2 will slide along the surface of the selector 18 without being gripped.

For again actuating the third rotatable unit 10, the second partial groove 20b is moved out of alignment with the first partial groove 20a, and the third partial groove 20c is moved into alignment with the first partial groove 20a. In this situation, the second actuation member 10a2 can enter into the first partial groove 20a. It will be appreciated that it can be possible that the second actuation member 10a2 can already enter into the first partial groove 20a when the first partial groove 20a and the third partial groove 20c are not yet in complete alignment. Hence, the second actuation member 10a2 can already enter into the first partial groove 20a when the third partial groove 20c is still moving into alignment with the first partial groove 20a. When the second actuation member 10a2 has entered into the first partial groove, the first partial groove 20a supports the second actuation member 10a2, allowing a force to be guided from the fourth unit 16 via the second actuation member 10a2 to the third rotatable unit 10. As a result, the third rotatable unit 10 will again be halted, and when, in use, the second rotatable unit 4 will remain rotating, the third rotatable unit 10 will be rotated relative to the second rotatable unit 4. The tooth 26 of the retainer 24 will be moved out of the notch 30 by sliding over a second angled face 30b of the notch. When the second rotatable unit 4 has rotated over approximately 60 degrees after gripping of the second actuation member 10a2 by the first partial groove 20a, the retractor member 4e, now 4e2, knocks the second actuation member 10a2 out of the first partial groove 20a and the third rotatable unit 10 resumes co-rotating with the second rotatable unit 4 again. The tooth 26 of the retainer 24 will be seated at the bottom of a notch 30 again. Having been rotated over 60 degrees, the third rotatable unit 10 has been rotated from a second position to a first position, or from a first position to a second position relative to the second rotatable unit 4. Now, the second actuation member 10a2 is maintained in a non-deployed position by the retractor member 4e again and is maintained at a distance from the selector 18 as shown in FIG. 4a.

At approximately the same time, the other retractor member 4e1 is also rotated and again releases the first actuation member 10a1 to engage the fourth unit 16. However, the first actuation member 10a1 cannot enter into the first partial groove 20a, as the shape of the first actuation member 10a1 requires the second partial groove 20b to align with the first partial groove 20a for allowing the first actuation member 10a1 to enter into the first partial groove 20a. The first actuation member 10a1 will now slide along the surface of the selector 18 without being gripped.

Thus, the selector 18 can be in a first mode for gripping the first actuation member and for not engaging the second actuation member, and in a second mode for gripping the second actuation member and not engaging the first actuation member.

It will be appreciated that in this example, forces from the third rotatable unit 10 via, the actuation members 10a are supported by the first partial groove 20a only. The second and third partial grooves 20b, 20c absorb no, or hardly any, force. The second and third partial grooves merely act as keys to select whether the first or second actuation member can enter the first partial groove 20a or not.

In the example of FIG. 6, it can be seen that the fourth unit 16 includes two toothed racks 22a, 22b. The first toothed rack 22a is connected to a bush carrying the second partial groove 20b. The second toothed rack 22b is connected to a bush carrying the third partial groove 20c. The toothed racks 22a, 22b can be driven by pinions of one or two electric motors.

In the example of FIGS. 6 and 7, the second partial groove 20b and the third partial groove 20c are arranged to be moved relative to the first partial groove 20a in a tangential displacement. Here the second and third partial grooves 20*b*, 20*c* are arranged to be moved simultaneously in opposite directions. In this example, the second partial groove 20*b* is arranged for moving in the same direction the as the first actuation member 10*a*1, i.e. along with the sliding of the first actuation member 10*a*1 along the surface of the selector 18, when the second partial groove 20*b* moves from the non-gripping mode to the gripping mode for the first actuation member 10*a*1. The third partial groove 20*c* is arranged for moving in the same direction as the second actuation member 10*a*2, i.e. along with the sliding of the second actuation member 10*a*2 along the surface of the selector 18, when the third partial groove 20*c* moves from the non-gripping mode to the gripping mode for the second actuation member 10*a*2. Hence, forces on the selector 18 are minimized, and symmetrical for both actuation members 10*a*.

FIGS. 14*a*-14*i* show another example of a mechanism for moving the third rotatable unit 10 from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit. The mechanism is similar to that described in view of FIGS. 4A-4C and 5. However, in this example the first and second body portions 10*b*1, 10*b*2 are biased in abutment with a resilient element 10*c* which here is formed by a compression spring.

In this example, the retainer 24 is different than in the example of FIGS. 4A-4C and 5. Here, the retainer 24 is formed as a an axially oriented retainer pin. In this example, four retainer pins are provided (divided over 360 degrees by 60-120-60-120 degrees). The retainer pin 24 is slidably held in a bore 24*a* in the first body portion 10*b*1. The second rotatable unit 4 includes a, here four, notch 30. The retainer pin 24 is biased towards the second rotatable unit 4 by a resilient element 28, here a compression spring. A tip of the retainer pin 24 which is directed towards the second rotatable unit 4 here is rounded. The rounded tip can match a shape of the notch 30. The notch 30 further has an angled face 30*a*. Within a certain angle of relative rotation from a predefined position, the actuation ring will reset its position due to the spring forces and the shape of the groove and top of the retainer pin.

Figure 14A:
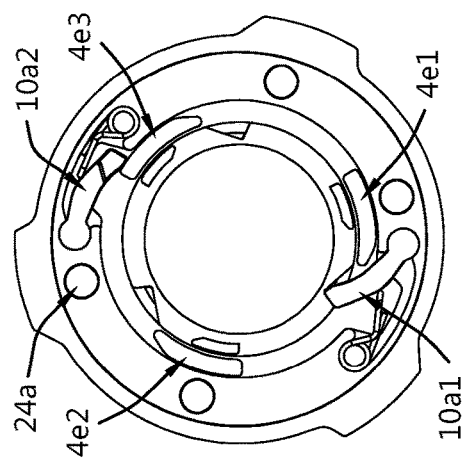
FIGS. 14a and 14d show an example of a clutch or brake system at a first relative rotational position.
Figure 14B:
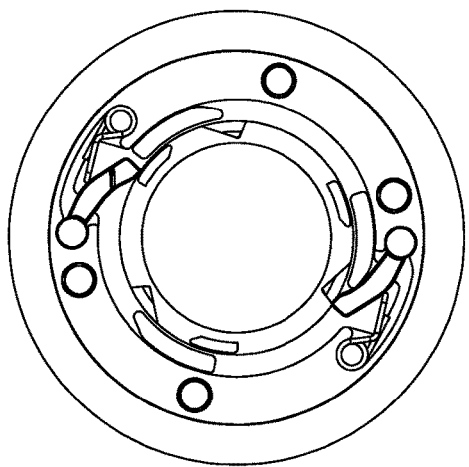
FIGS. 14b and 14e show an example of a clutch or brake system at a second relative rotational position.
Figure 14C:
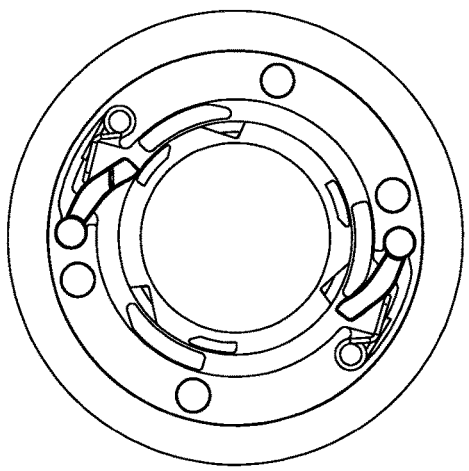
FIGS. 14c and 14f show an example of a clutch or brake system at a third relative rotational position.
Figure 14D:
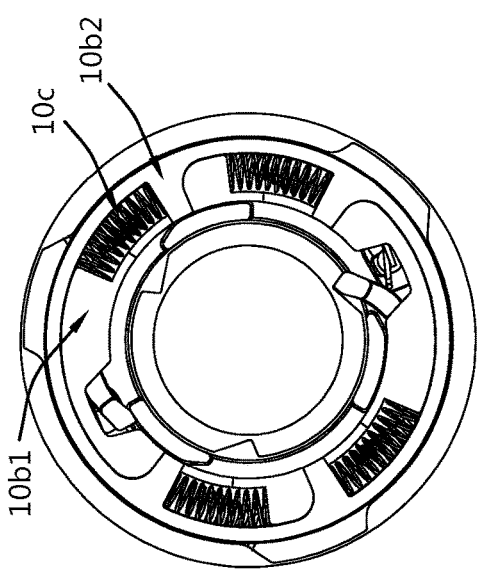
Figure 14E:
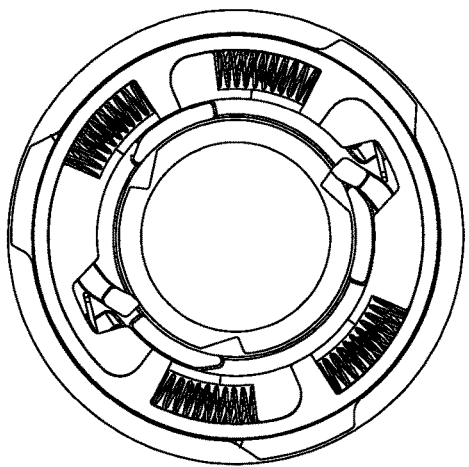
Figure 14F:
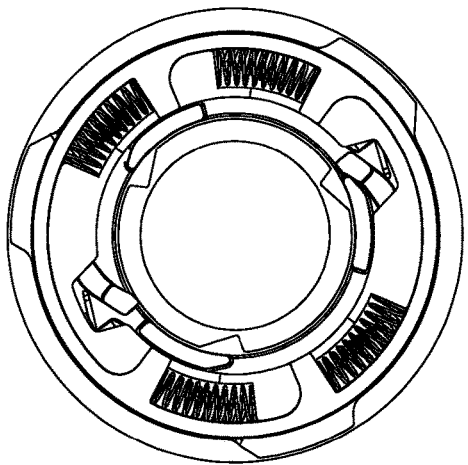
Figure 14G:
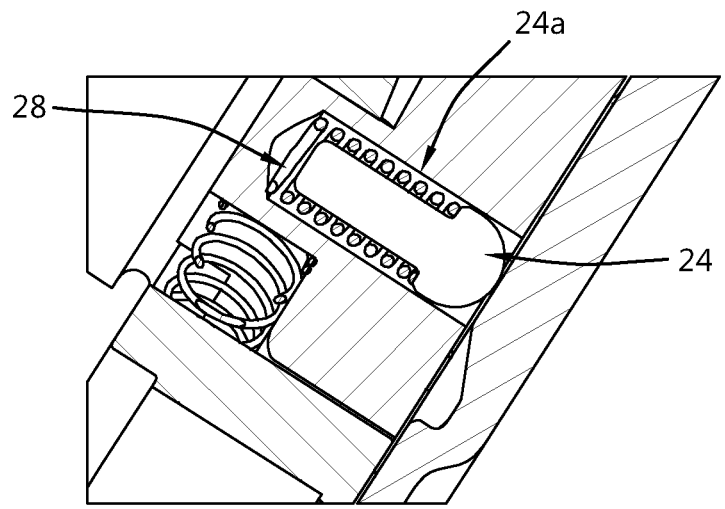
FIG. 14g show a detail of a clutch or brake system of FIGS. 14a and 14d.
Figure 14H:
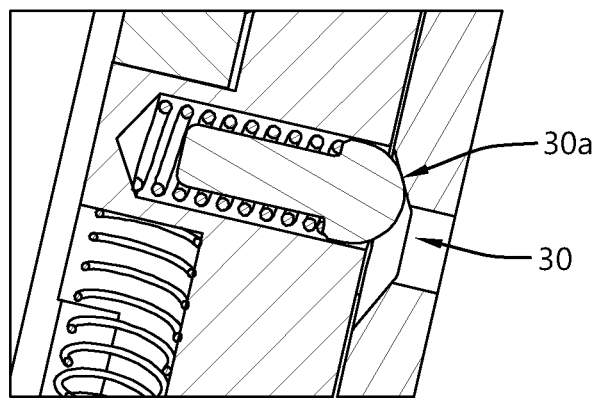
FIG. 14h show a detail of a clutch or brake system of FIGS. 14b and 14e.
Figure 14I:
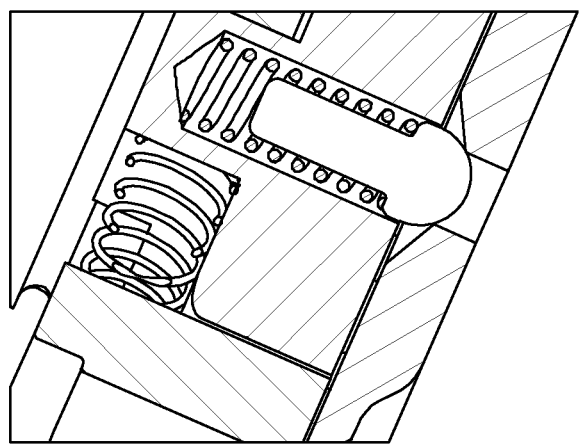
FIG. 14i show a detail of a clutch or brake system of FIGS. 14c and 14f.

As can be seen in FIGS. 14*b*, 14*e* and 14*h*, when the retractor member 4*e*1 has knocked the first actuation member 10*a*1 out of the first partial groove 20*a* the tip of the retainer pin 24 is on the angled face 30*a* of the notch 30. Due to the biasing force of the resilient element 28, the tip is pushed along the angled face 30*a* to the bottom of the notch 30, as can be seen in FIG. 14*i*. As a result, the third rotatable unit 10 assumes a defined angular position relative to the second rotatable unit 4. Also, the slight angular movement from the situation shown in FIGS. 14*b*, 14*e* and 14*h*, with the actuation member 10*a*1 just freed from the groove 20, to the situation shown in FIGS. 14*c*, 14*f* and 14*i*, enables that the retractor member 4*e*1 lifts the actuation member 10*a*1 away from the groove 20, so that mechanical contact between the actuation member 10*a*1 and the fourth unit 16 can be avoided.

When the first body portion 10*b*1 is rotated against the springs(s) 10*c*, the second body portion 10*b*2 keeps its position due to the higher force of the springs 28. This enables the second body portion 10*b*2 to keep its position even when the first body portion 10*b*1 has to rotate a little with respect to the second body portion 10*b*2 during a shift.

Figure 8A:
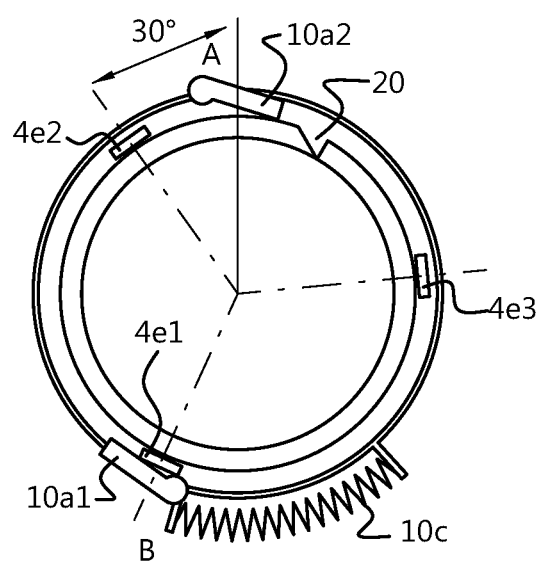
FIGS. 8a-8d show an example of gripping and ungripping the actuation members.
Figure 8B:
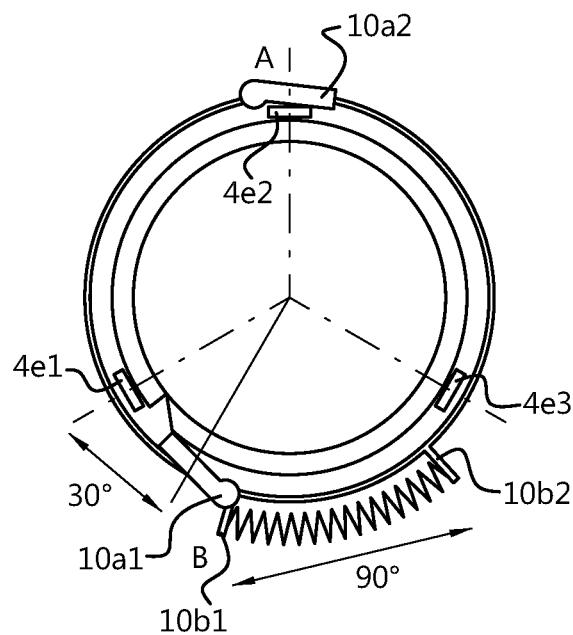
Figure 8C:
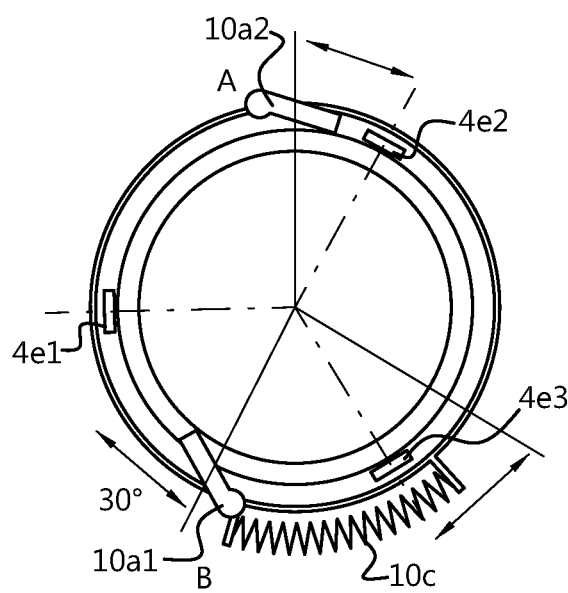
Figure 8D:
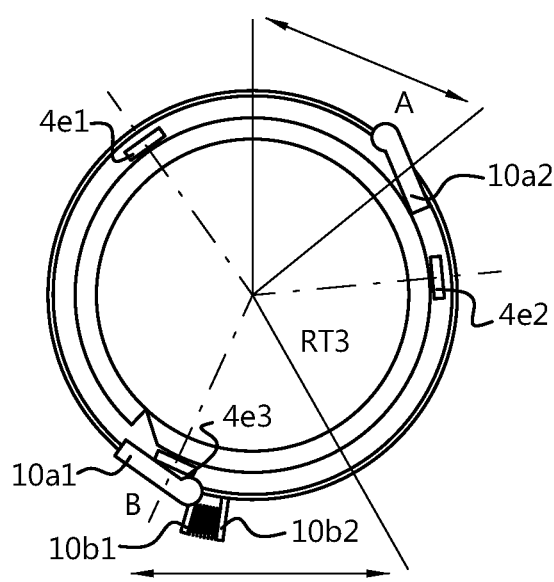

FIGS. 8*a*-8*d* show an example of gripping and ungripping the actuation members 10*a* in the groove 20. In FIG. 8*a* the first actuation member 10*a*1 is arrested on the retractor member 4*e*1. The second actuation member 10*a*2 is ready for being gripped by the groove 20. In FIG. 8*b* the second rotatable unit 4 having the retractor members 4*e* has been rotated over 30 degrees relative to the position in FIG. 8*a*. In FIG. 8*b* the second actuation member 10*a*2 is arrested on the retractor member 4*e*2. The first actuation member 10*a*1 is ready for being gripped by the groove 20. In FIG. 8*c* the first actuation member 10*a*1 has been gripped by the groove 20. The third rotatable body 10 does not rotate. The retractor member 4*e*2 slips from under the second actuation member 10*a*2. The gripping members 4*a* are not engaged with the first abutment surfaces. The second body portion 10*b*2 of the third rotatable body 10 is not entrained in rotation over the free upshift angle as no forces act on it. However, continued rotation of the first rotatable unit 2 relative to the third rotatable body 10 causes the gripping members 4*a* to engage. Then the second body portion 10*b*2 of the third rotatable body 10 co-rotates with the first rotatable unit 2 in view of the engaged griping members 4*a*. Then the resilient element 10*c* is compressed (FIG. 8*d*) as the first body portion 10*b*1 of the third rotatable body 10 is still prevented from rotating by the gripped first actuation member 10*a*1. When the first rotatable unit 2 is driven, the gripping members 4*a* can automatically disengage. When the first rotatable unit 2 is not driven, engagement of the gripping members 4*a* can maintain while the first actuation member 10*a*1 is lift from the groove and the first actuation member is arrested on the retractor 4*e*3 (forces arresting the first actuation member 10*a*1 on the retractor 4*e*3 must thereto be larger than the force of the compressed resilient element 10*c*). When the gripping members 4*a* are disengaged (e.g. by driving the first rotatable unit, e.g. by exerting force to the bicycle pedals) the second body portion 10*b*2 of the third rotatable body 10 is rotated back over the resilient upshift angle while relaxing the resilient member 10*c*. Herein the gripping members 4*a* are retained by the retaining members 12. Thus the situation of FIG. 8*a* is regained.

Figure 12A:
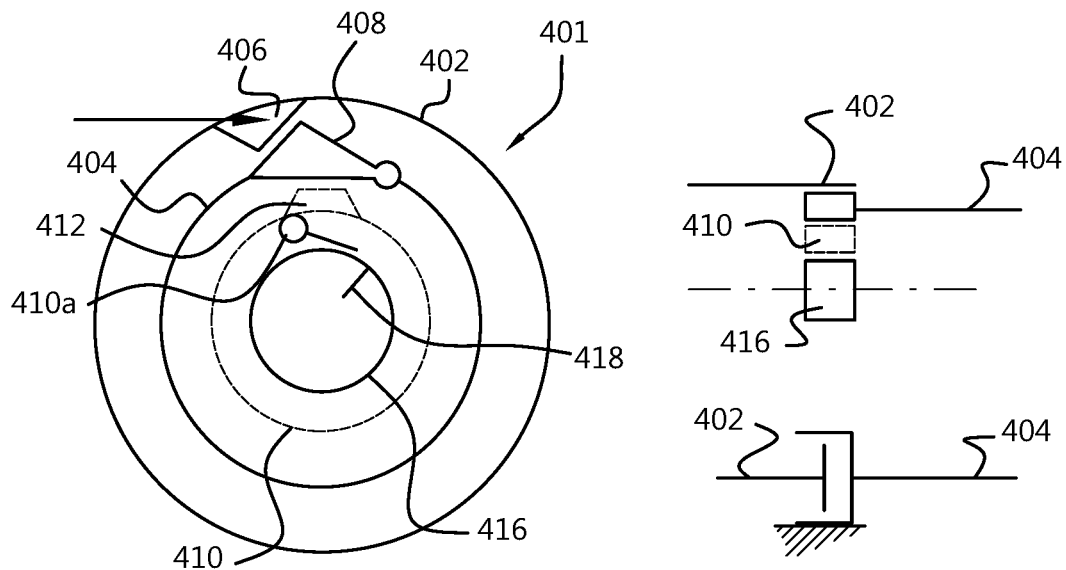
FIG. 12A shows an example of a clutch or brake system.

FIG. 12A shows a schematic representation of a clutch or brake system 401. The clutch or brake system 401 can be used as the clutch or brake system 316 in the transmission system 300 as described in view of FIG. 13. The clutch or brake system in FIG. 12A includes an, here rotatable, input ring 402. The input ring 402 is arranged to be connected to the input. The input ring 402 can e.g. be embodied as the first unit 2 as described in view of FIGS. 1-8. The clutch or brake system 401 includes an, here rotatable, output ring 404. The output ring 404 is arranged to be connected to the output. The output ring 404 can e.g. be embodied as the second unit 4 as described in view of FIGS. 1-8. The input ring 402 includes at least one first abutment surface 406. The output ring 404 includes at least one second abutment surface 408. The clutch or brake system 401 in FIG. 12A includes a, here rotatable, shift ring 410. The shift ring 410 includes at least one retaining member 412. The shift ring 410 can e.g. be embodied as the third unit 10 as described in view of FIGS. 1-8. The shift ring 410 includes at least one actuation member 410*a* arranged for moving the shift ring 410 from a first position to a second position or from a second position to a first position relative to the output ring 404. In FIG. 12A the clutch or brake system 401 further includes a, here non-rotatable, selector ring 416. The selector ring 416 can be arranged to be non-rotatably mounted to a frame of the bicycle. The selector ring 416 includes a selector 418. The selector ring 416 can e.g. be embodied as the fourth unit 16 as described in view of FIGS. 1-8.

In the example of FIG. 12A, the input ring 402 is on the outside. The shift ring 410 rotates with the output ring 404 and at output speed. The selector ring 416 enables position change of the shift ring 410 relative to the output ring 404. The selector ring 416 is actuated from the fixed world on the inside. When used as a brake, the output ring 404 is preferred to be coupled to the fixed world.

Figure 12B:
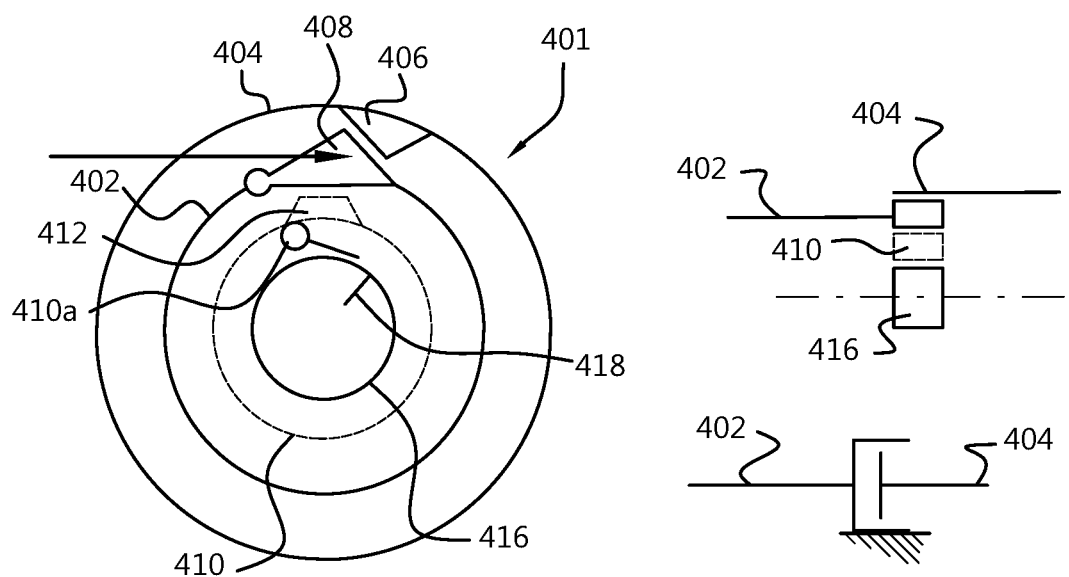
FIG. 12B shows an example of a clutch or brake system.

FIG. 12B shows a schematic representation of a clutch or brake system 401. The clutch or brake system 401 can be used as the clutch or brake system 316 in the transmission system 300 as described in view of FIG. 13. The clutch or brake system in FIG. 12B includes an, here rotatable, input ring 402. The input ring 402 is arranged to be connected to the input. The input ring 402 can e.g. be embodied as the second unit 4 as described in view of FIGS. 1-8. The clutch or brake system 401 includes an, here rotatable, output ring 404. The output ring 404 is arranged to be connected to the output. The output ring 404 can e.g. be embodied as the first unit 2 as described in view of FIGS. 1-8. The input ring 402 includes at least one first abutment surface 406. The output ring 404 includes at least one second abutment surface 408. The clutch or brake system 401 in FIG. 12B includes a, here rotatable, shift ring 410. The shift ring 410 includes at least one retaining member 412. The shift ring 410 can e.g. be embodied as the third unit 10 as described in view of FIGS. 1-8. The shift ring 410 includes at least one actuation member 410a arranged for moving the shift ring 410 from a first position to a second position or from a second position to a first position relative to the output ring 404. In FIG. 12B the clutch or brake system 401 further includes a, here non-rotatable, selector ring 416. The selector ring 416 can be arranged to be non-rotatably mounted to a frame of the bicycle. The selector ring 416 includes a selector 418. The selector ring 416 can e.g. be embodied as the fourth unit 16 as described in view of FIGS. 1-8.

In the example of FIG. 12B, the output ring 404 is on the outside. The shift ring 410 rotates with input ring 402 and at input speed. The selector ring 416 enables position change of the shift ring 410 relative to the input ring 402. The selector ring 416 is actuated from the fixed world on the inside.

Figure 12C:
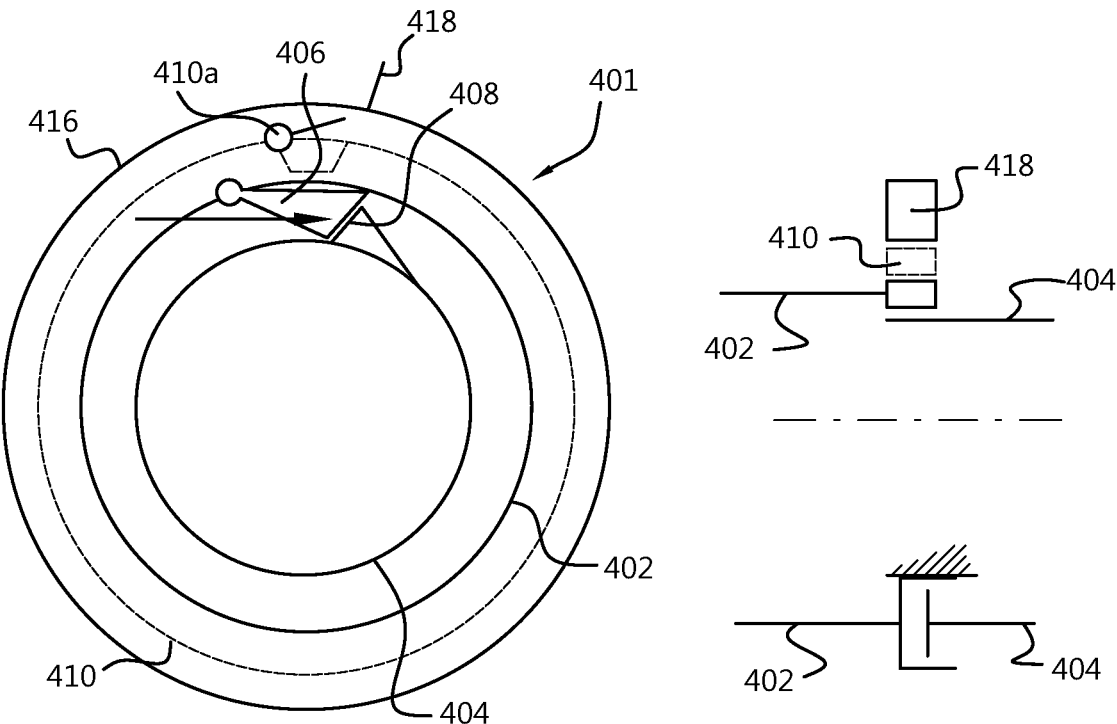
FIG. 12C shows an example of a clutch or brake system.

FIG. 12C shows a schematic representation of a clutch or brake system 401. The clutch or brake system 401 can be used as the clutch or brake system 316 in the transmission system 300 as described in view of FIG. 13. The clutch or brake system in FIG. 12C includes an, here rotatable, input ring 402. The input ring 402 is arranged to be connected to the input. The clutch or brake system 401 includes an, here rotatable, output ring 404. The output ring 404 is arranged to be connected to the output. The input ring 402 includes at least one first abutment surface 406. The output ring 404 includes at least one second abutment surface 408. The clutch or brake system 401 in FIG. 12C includes a, here rotatable, shift ring 410. The shift ring 410 includes at least one retaining member 412. The shift ring 410 includes at least one actuation member 410a arranged for moving the shift ring 410 from a first position to a second position or from a second position to a first position relative to the output ring 404. In FIG. 12C the clutch or brake system 401 further includes a, here non-rotatable, selector ring 416. The selector ring 416 can be arranged to be non-rotatably mounted to a frame of the bicycle. The selector ring 416 includes a selector 418.

In the example of FIG. 12C, the output ring 404 is on the inside. Here, the selector ring 416 is on the outside. The shift ring 410 rotates with input ring 402 and at input speed. The selector ring 416 enables position change of the shift ring 410 relative to the input ring 402. The selector ring 416 is actuated from the fixed world on the outside.

Figure 12D:
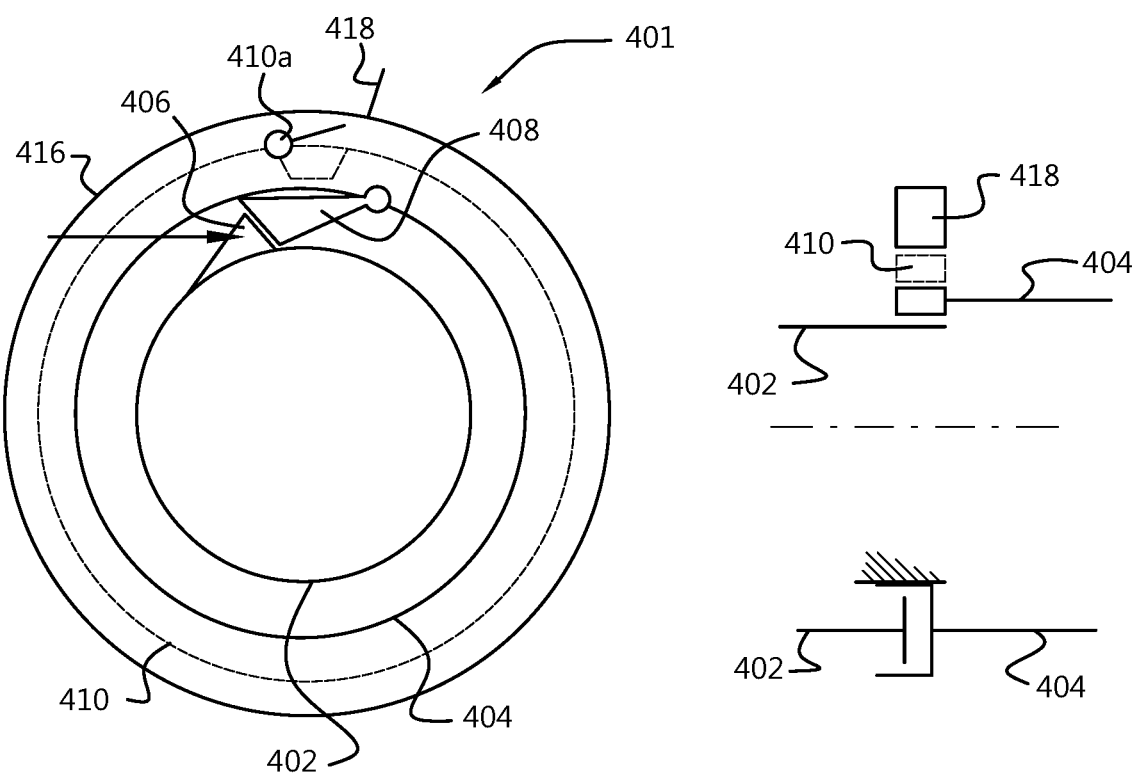
FIG. 12D shows an example of a clutch or brake system.

FIG. 12D shows a schematic representation of a clutch or brake system 401. The clutch or brake system 401 can be used as the clutch or brake system 316 in the transmission system 300 as described in view of FIG. 13. The clutch or brake system in FIG. 20 includes an, here rotatable, input ring 402. The input ring 402 is arranged to be connected to the input. The clutch or brake system 401 includes an, here rotatable, output ring 404. The output ring 404 is arranged to be connected to the output. The input ring 402 includes at least one first abutment surface 406. The output ring 404 includes at least one second abutment surface 408. The clutch or brake system 401 in FIG. 20 includes a, here rotatable, shift ring 410. The shift ring 410 includes at least one retaining member 412. The shift ring 410 includes at least one actuation member 410a arranged for moving the shift ring 410 from a first position to a second position or from a second position to a first position relative to the output ring 404. In FIG. 12D the clutch or brake system 401 further includes a, here non-rotatable, selector ring 416. The selector ring 416 can be arranged to be non-rotatably mounted to a frame of the bicycle. The selector ring 416 includes a selector 418.

In the example of FIG. 12D, the input ring 402 is on the inside. Here, the selector ring 416 is on the outside. The shift ring 410 rotates with the output ring 402 and at output speed. The selector ring 416 enables position change of the shift ring 410 relative to the output ring 404. The selector ring 416 is actuated from the fixed world on the outside. When used as brake, the output ring 404 is preferred to be coupled to the fixed world.

Figure 9A:
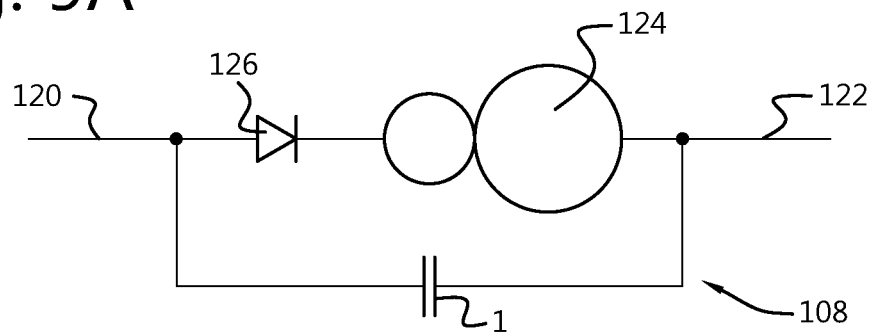
FIGS. 9a-9c show schematic examples of a torque transmission.

FIG. 9a shows a schematic example of a torque transmission 108. The torque transmission 108 includes an input 120 and an output 122. The torque transmission 108 includes a gear transmission 124. Here the gear transmission 124 is a reduction for converting a rotational speed at the input 120 to a reduced rotational speed at the output 122. The torque transmission also includes a clutch system 1, e.g. as described in view of FIGS. 1-7. The gear transmission 124 is selectably included in the torque transmission 108. The torque transmission is arranged for, in a first mode, transmitting the rotational speed at the input 120 unchanged to the output 122, when the clutch system 1 is engaged. The torque transmission is arranged for, in a second mode, transmitting the rotational speed at the input 120 reduced to the output 122, when the clutch system 1 is disengaged. An overrunning clutch 126 is included, in this example in series with the gear transmission 124.

Figure 10A:
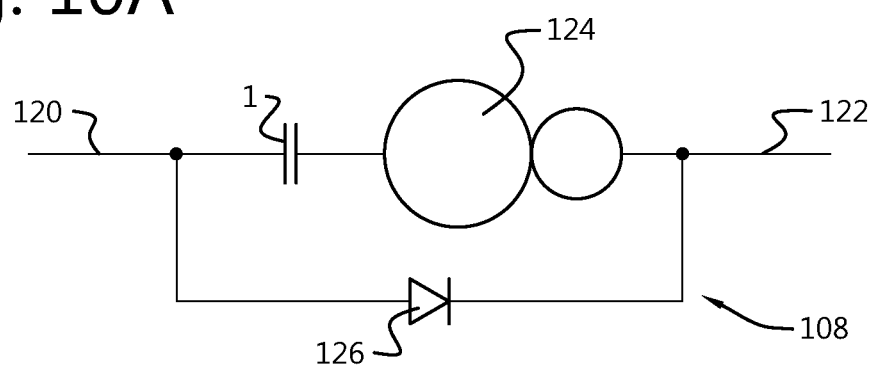
FIGS. 10a-10c show schematic examples of a torque transmission and
FIG. 11 shows an example of a wheel axle assembly.

FIG. 10a shows a schematic example of a torque transmission 108. The torque transmission 108 includes an input 120 and an output 122. The torque transmission 108 includes a gear transmission 124. Here the gear transmission 124 is a arranged for converting a rotational speed at the input 120 to an increased rotational speed at the output 122. The torque transmission also includes a clutch system 1, e.g. as described in view of FIGS. 1-7. The gear transmission 124 is selectably included in the torque transmission 108. The torque transmission is arranged for, in a first mode, transmitting the rotational speed at the input 120 unchanged to the output 122, when the clutch system 1 is disengaged. The torque transmission is arranged for, in a second mode, transmitting the rotational speed at the input 120 increased to the output 122, when the clutch system 1 is engaged. An overrunning clutch 126 is included, in this example in parallel with the gear transmission 124.

Figure 9B:
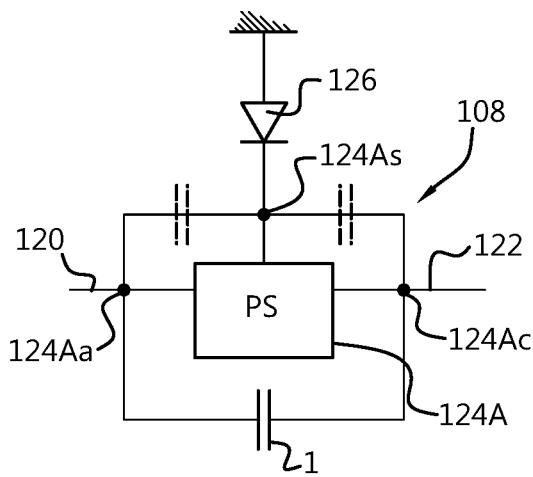

FIG. 9b shows a schematic example of a torque transmission 108. The torque transmission 108 includes an input 120 and an output 122. The torque transmission 108 includes a gear transmission 124. Here the gear transmission 124 is a planetary gear system 124A for converting a rotational speed at the input 120 to a reduced rotational speed at the output 122. In this example, the input 120 is connected to the annulus 124Aa of the planetary gear system 124A. Here, the output 122 is connected to the carrier 124Ac of the planetary gear system 124A. The torque transmission also includes a clutch system 1, e.g. as described in view of FIGS. 1-7, here included selectively connecting the annulus and the carrier. The sun wheel 124As of the planetary gear system 124A is connected to a non-rotary part via the overrunning clutch 126. The torque transmission is arranged for, in a first mode, transmitting the rotational speed at the input 120 unchanged to the output 122, when the clutch system 1 is engaged. The torque transmission is arranged for, in a second mode, transmitting the rotational speed at the input 120 reduced to the output 122, when the clutch system 1 is disengaged. Decoupling of the overrunning clutch 126 may be required for allowing the output 122 in reverse direction. An input overrunning clutch 128 may be required for freewheeling, e.g. while driving without pedaling.

Figure 9C:
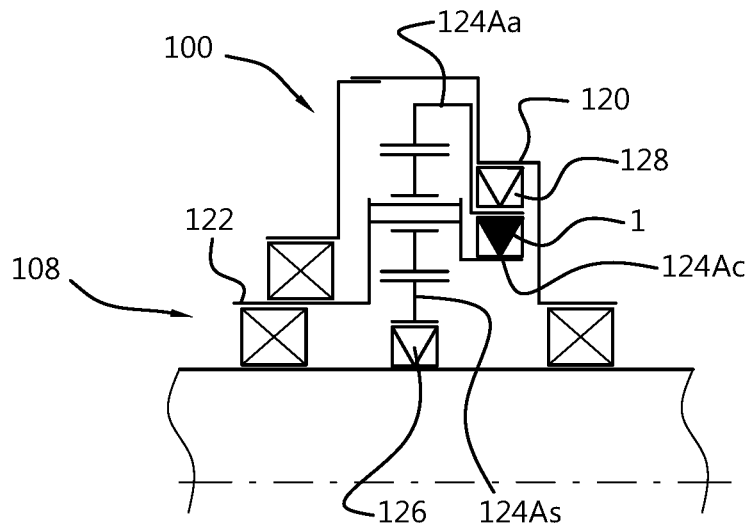

FIG. 9c shows a schematic cross section of a torque transmission 108 according to FIG. 9b in an axle assembly 100, such as a bicycle rear wheel assembly.

Figure 10B:
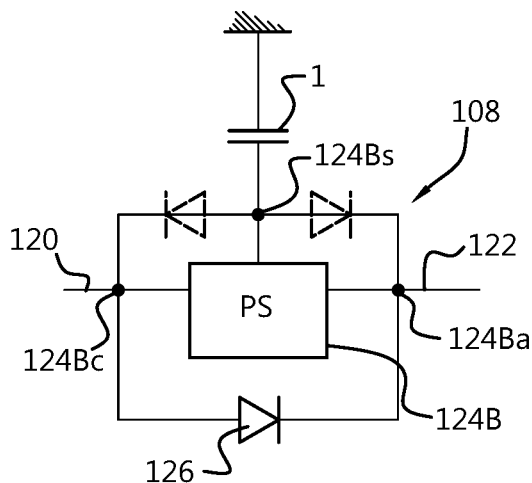

FIG. 10b shows a schematic example of a torque transmission 108. The torque transmission 108 includes an input 120 and an output 122. The torque transmission 108 includes a gear transmission 124. Here the gear transmission 124 is a planetary gear system 124B for converting a rotational speed at the input 120 to an increased rotational speed at the output 122. In this example, the input 120 is connected to the carrier 124Bc of the planetary gear system 124B. Here, the output 122 is connected to the annulus 124Ba of the planetary gear system 124B. The torque transmission also includes a clutch system 1, e.g. as described in view of FIGS. 1-7, here included selectively connecting the sun wheel 124Bs of the planetary gear system 124B to a non-rotary part. The carrier is connected to the annulus via an overrunning clutch 126. The torque transmission is arranged for, in a first mode, transmitting the rotational speed at the input 120 unchanged to the output 122, when the clutch system 1 is disengaged. The torque transmission is arranged for, in a second mode, transmitting the rotational speed at the input 120 reduced to the output 122, when the clutch system 1 is engaged. Decoupling of the overrunning clutch 126 may be required for allowing the output 122 in reverse direction. An input overrunning clutch 128 may be required for freewheeling, e.g. while driving without pedaling.

Figure 10C:
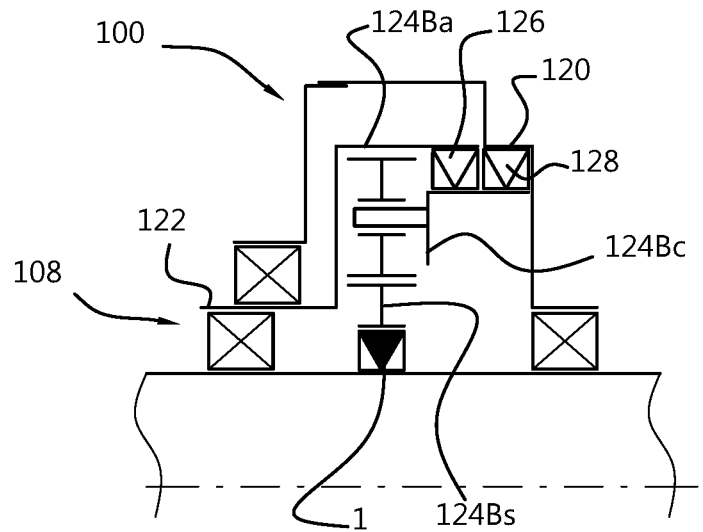

FIG. 10c shows a schematic cross section of a torque transmission 108 according to FIG. 10b in an axle assembly 100, such as a bicycle rear wheel assembly.

Figure 11:
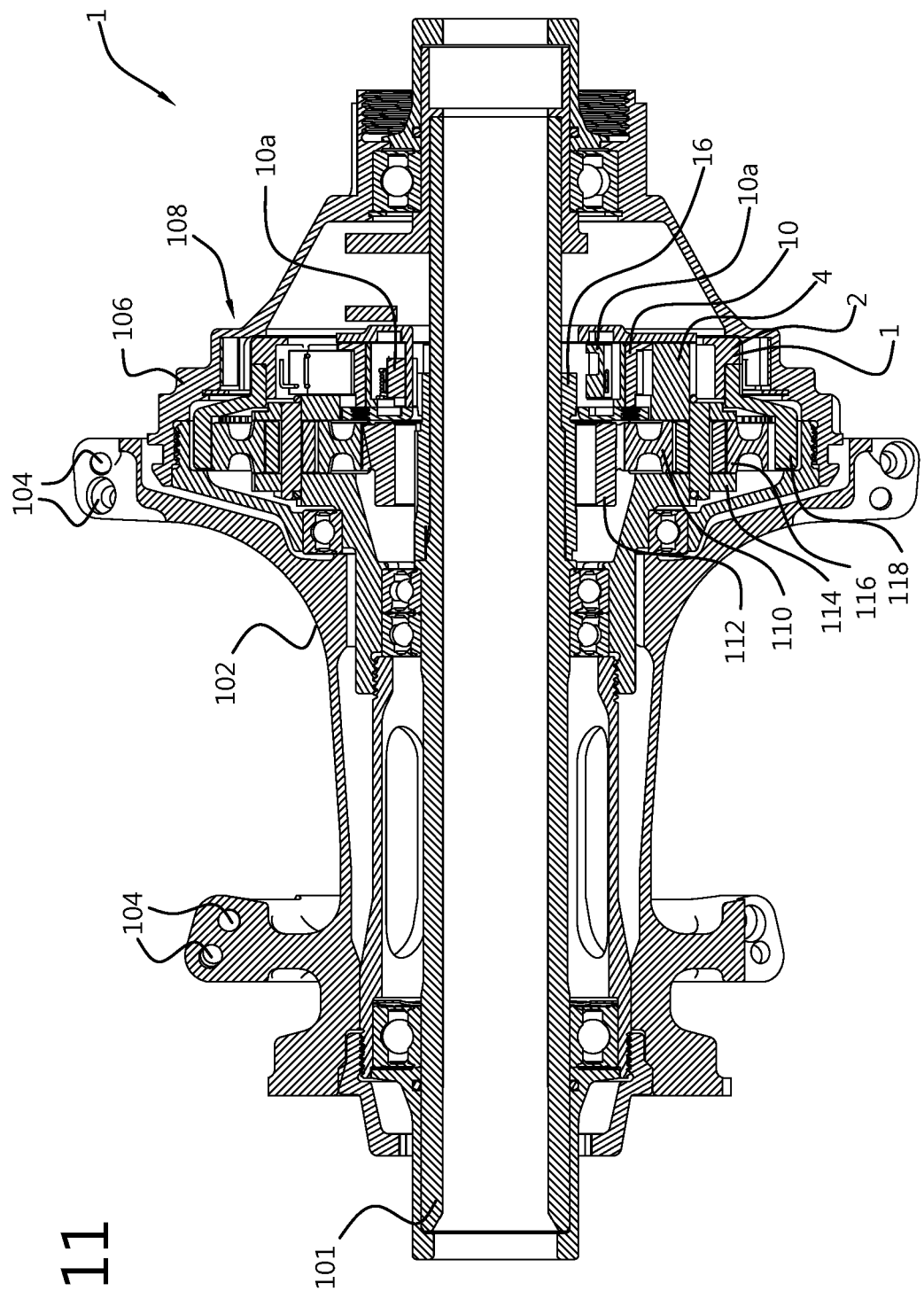

FIG. 11 shows an example of an axle assembly 100. In this example, the axle assembly is a rear bicycle assembly. The axle assembly 100 here includes a hollow axle 101. In this example, the hollow axle 101 is arranged for non-rotatably being fixed to a frame, e.g. a bicycle frame. In this example the axle assembly is an axle assembly for a bicycle. The axle assembly 100 includes a hub 102. Here the hub 102 is provided with apertures 104, e.g. for connection of spokes of a wheel, The axle assembly 102 further includes a driver 106. The driver 106 in this example is arranged for receiving a cassette of gear wheels (not shown).

The axle assembly 100 in this example includes a torque transmission 108, Here the torque transmission includes a clutch system 1, e.g. as described in view of FIGS. 1-7, and a gear means, here a planetary gear 110, The planetary gear 110 includes a sun gear 112, a planet carrier 114 with planet gears 116 and a ring gear 118. The clutch system 1 is arranged in the torque transmission 108 so as to selectively couple two of the sun gear, the planet carrier and the ring gear. In this example, In this example, the clutch system 1 is arranged in the torque transmission 108 so as to selectively couple the planet carrier 114 and the ring gear 118.

The planet carrier 114 is also fixedly coupled to the hub 102. Therefore, depending on whether the first rotatable unit 2 and second rotatable unit 4 are rotationally coupled, or rotationally disengaged, driving the driver 106 causes the hub 102 to rotate according to a first or second gear ratio relative to the driver 106. An overrunning clutch may thereto be positioned between the sun gear 112 and the axle 101. In the examples of FIGS. 1-7 and 8, the first rotatable unit 2, the second rotatable unit 4, the third rotatable unit 10, and the fourth unit 16 are coaxial. Here, the fourth unit 16 is positioned at least partially within the third rotatable unit 10. Here the third rotatable unit 10 is at least partially positioned within the second rotatable unit 4. Here the second rotatable unit 4 is at least partially positioned within the first rotatable unit 2.

The clutch system 1 can e.g. be used for selectively operating a planetary gear according to a first mode when the second rotatable unit is engaged with the first rotatable unit, and according to a second mode when the second rotatable unit is disengaged from the first rotatable unit. Hence, the clutch system 1 can be used in a torque transmission for operating the torque transmission at a first transmission ratio in the first mode, and at a second, different transmission ratio in the second mode. The clutch system can e.g. be used in a rear hub of a bicycle. The clutch system can then be used e.g. for emulating the functioning of a front derailleur, so as to be able to omit the front derailleur from the bicycle. The invention also relates to a bicycle including such clutch system.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

In the examples, the transmission has a fixed first transmission ratio in the first mode and a fixed second transmission ratio in the second mode. It is also possible that the transmission is embodied as a continuously variable transmission. The continuously variable transmission can be arranged to selectively be in a first mode and in a second mode. A first transmission ratio of the continuously variable transmission in the first mode is different from a second transmission ratio in the second mode. While switching from the first to the second transmission ratio or vice-versa, the continuously variable transmission can traverse all (continuous) intermediate transmission ratios. The continuously variable transmission can also used to switch from the first to a second and to a third transmission ratio or vice-versa.

The first and the second, and possibly the third, transmission ratio can be chosen by the controller and possibly preprogrammed by the user. The user can e.g. select desired transmission ratios and set these in the controller. Thereto, the controller can include a user interface. It is also possible that the transmission ratios are selected on a communications device, such as a smartphone or tablet, and communicated to the controller. A computer program product, such as an app, can thereto be executed on the communications device.

The transmission ratio(s) can be chosen by the controller and can be adapted depending on the sprocket that is engaged with the chain. It is also possible that the user preprograms transmission ratios depending on the sprocket that can be engaged with the chain.

In the examples, the first rotatable unit includes nine first abutment surfaces. It will be appreciated that other numbers of first abutment surfaces, such as one, two, three, four, six or any other suitable number are also possible. In the examples, the second rotatable unit includes three second abutment surfaces. It will be appreciated that other numbers of second abutment surfaces, such as one, two, four, six or any other suitable number are also possible. In the examples, the third rotatable unit includes three retaining members. It will be appreciated that other numbers of retaining members, such as one, two, four, six or any other suitable number are also possible. In the examples, the third rotatable unit includes two actuation members. It will be appreciated that other numbers of actuation members, such as one, three, four, six or any other suitable number are also possible.

In the examples, the gripping members are separate items hingedly connected to the body portion of the second rotatable unit. It will be appreciated that it is also possible that the gripping members are integral with the body portion of the second rotatable unit.

In the examples, the third rotatable unit includes an first body portion and a second body portion. It will be appreciated that the first and second body portions may also be an integral portion.

In the examples, the actuation members are separate items hingedly connected to the body portion of the third rotatable unit. It will de appreciated that it is also possible that the actuation members are integral with the body portion of the third rotatable unit.

In the examples, the gripping members are arranged for pivoting in a radial direction. It will be appreciated that it is also possible that the gripping members are arranged for pivoting in an axial direction. Then e.g. the second rotatable unit and the first rotatable unit can be positioned, at least partially, axially next to each other. Also, then the third rotatable unit and the second rotatable unit can be positions, at least partially, axially next to each other.

In the examples, the actuation members are arranged for pivoting in a radial direction. It will be appreciated that it is also possible that the actuation members are arranged for pivoting in an axial direction. Then e.g. the third rotatable unit and the fourth unit can be positioned, at least partially, axially next to each other.

In the examples, the first unit, second unit, third unit, and fourth unit are positioned concentrically. It will be appreciated that one or more of the units may also be placed axially next to each other. In the examples, the input ring, output ring, shift ring, and selector ring are positioned concentrically. It will be appreciated that one or more of the rings may also be placed axially next to each other.

Hence, it is also envisaged that:
a) the first unit is connectable to the input, the second unit is connectable to the output, the second unit is arranged at least partially coaxially inside the first unit, the third unit is arranged at least partially coaxially inside the second unit, and the fourth unit is arranged at least partially coaxially inside the third unit;
b) the first unit is connectable to the output, the second unit is connectable to the input, the second unit is arranged at least partially coaxially inside the first unit, the third unit is arranged at least partially coaxially inside the second unit, and the fourth unit is arranged at least partially coaxially inside the third unit:
c) the first unit is connectable to the output, the second unit is connectable to the input, the first unit is arranged at least partially coaxially inside the second unit, the second unit is arranged at least partially coaxially inside the third unit, and the third unit is arranged at least partially coaxially inside the fourth unit;
d) the first unit is connectable to the input, the second unit is connectable to the output, the first unit is arranged at least partially coaxially inside the second unit, the second unit is arranged at least partially coaxially inside the third unit, and the third unit is arranged at least partially coaxially inside the fourth unit;
e) the first unit is connectable to the input, the second unit is connectable to the output, the second unit is arranged at least partially axially beside the first unit, the third unit is arranged at least partially axially beside the first unit or the second unit, and the fourth unit is arranged at least partially axially beside the third unit;
f) the first unit is connectable to the output, the second unit is connectable to the input, the second unit is arranged at least partially axially beside the first unit, the third unit is arranged at least partially axially beside the first unit or the second unit, and the fourth unit is arranged at least partially axially beside the third unit;
g) the first unit is connectable to the input, the second unit is connectable to the output, the second unit is arranged at least partially coaxially inside the first unit, the third unit is arranged at least partially axially beside the first and/or second unit and the fourth unit is arranged at least partially axially beside the third unit:
h) the first unit is connectable to the output, the second unit is connectable to the input, the second unit is arranged at least partially coaxially inside the first unit, the third unit is arranged at least partially axially beside the first and/or second unit, and the fourth unit is arranged at least partially axially beside the third unit;
i) the first unit is connectable to the input, the second unit is connectable to the output, the second unit is arranged at least partially coaxially inside the first unit, the third unit is arranged at least partially axially beside the first and/or second unit and the fourth unit is arranged at least partially coaxially inside and/or outside the third unit;
j) the first unit is connectable to the output, the second unit is connectable to the input, the second unit is arranged at least partially coaxially inside the first unit, the third unit is arranged at least partially axially beside the first and/or second unit, and the fourth unit is arranged at least partially coaxially inside and/or outside the third unit;
k) the first unit is connectable to the input, the second unit is connectable to the output, the first unit is arranged at least partially coaxially inside the second unit, the third unit is arranged at least partially axially beside the first and/or second unit, and the fourth unit is arranged at least partially axially beside the third unit:

l) the first unit is connectable to the output, the second unit is connectable to the input, the first unit is arranged at least partially coaxially inside the second unit, the third unit is arranged at least partially axially beside the first and/or second unit, and the fourth unit is arranged at least partially axially beside the third unit;

m) the first unit is connectable to the input, the second unit is connectable to the output, the first unit is arranged at least partially coaxially inside the second unit, the third unit is arranged at least partially axially beside the first and/or second unit, and the fourth unit is arranged at least partially coaxially inside and/or outside the third unit;

n) the first unit is connectable to the output, the second unit is connectable to the input, the first unit is arranged at least partially coaxially inside the second unit, the third unit is arranged at least partially axially beside the first and/or second unit, and the fourth unit is arranged at least partially coaxially inside and/or outside the third unit;

o) the first unit is connectable to the input, the second unit is connectable to the output, the second unit is arranged at least partially axially beside the first unit, the third unit is arranged at least partially coaxially inside the first and/or second unit, and the fourth unit is arranged at least partially coaxially inside the third unit;

p) the first unit is connectable to the input, the second unit is connectable to the output, the second unit is arranged at least partially axially beside the first unit, the third unit is arranged at least partially coaxially inside the first and/or second unit, and the fourth unit is arranged at least partially coaxially inside the third unit;

q) the first unit is connectable to the input, the second unit is connectable to the output, the second unit is arranged at least partially axially beside the first unit, the third unit is arranged at least partially coaxially inside the first and/or second unit, and the fourth unit is arranged at least partially axially beside the third unit:

r) the first unit is connectable to the input, the second unit is connectable to the output, the second unit is arranged at least partially axially beside the first unit, the third unit is arranged at least partially coaxially inside the first and/or second unit, and the fourth unit is arranged at least partially axially beside the third unit;

s) the first unit is connectable to the input, the second unit is connectable to the output, the second unit is arranged at least partially axially beside the first unit, the third unit is arranged at least partially coaxially around the first and/or second unit, and the fourth unit is arranged at least partially coaxially around the third unit;

t) the first unit is connectable to the input, the second unit is connectable to the output, the second unit is arranged at least partially axially beside the first unit, the third unit is arranged at least partially coaxially around the first and/or second unit, and the fourth unit is arranged at least partially coaxially around the third unit:

u) the first unit is connectable to the input, the second unit is connectable to the output, the second unit is arranged at least partially axially beside the first unit, the third unit is arranged at least partially coaxially around the first and/or second unit, and the fourth unit is arranged at least partially axially beside the third unit; or v) the first unit is connectable to the input, the second unit is connectable to the output, the second unit is arranged at least partially axially beside the first unit, the third unit is arranged at least partially coaxially around the first and/or second unit, and the fourth unit is arranged at least partially axially beside the third unit Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A transmission system for a bicycle, including:
   a system input;
   a system output;
   a chain ring;
   a set of sprockets, having varying numbers of teeth;
   a transmission unit including:
      a transmission operable according to a first transmission ratio and a second transmission ratio,
      an actuation system for switching from the first to the second transmission ratio or vice versa, arranged to switch under load, and
      a first electronically operated actuator for controlling the actuation system for switching;
   a chain driven by a chain ring for transferring torque to a selected one of the sprockets;
   a second electronically operated actuator for selecting the torque transfer from the chain to one of the sprockets for transmission of torque;
      wherein the transmission unit has an input coupled to the system input or the set of sprockets and an output arranged to be coupled to the chain ring or to the system output;
      wherein the transmission unit and the selected one of the sprockets define a system transmission ratio between the system input and the system output; and
   a controller configured to receive an electronic upshift signal and/or a downshift signal, and configured to, depending on the system transmission ratio in use, select which one or both of the first actuator and the second actuator to actuate for selecting the next higher system transmission ratio in response to receiving the upshift signal and for selecting the next lower system transmission ratio in response to receiving the downshift signal;

wherein the controller is further configured to, depending on the system transmission ratio in use, select which one or both of the first and second actuators to actuate for selecting the second next, third next, fourth next or fifth next higher or lower system transmission ratio in response to receiving a further signal.

2. The transmission system of claim 1, wherein the actuation system includes a clutch or brake system for switching from the first to the second transmission ratio or vice versa, arranged to couple and/or decouple under load.

3. The transmission system according to claim 1, wherein the transmission can maintain torque transfer during the switch from the first to the second transmission ratio or vice-versa.

4. The transmission system according to claim 1, wherein the first and second transmission ratios can be chosen or adapted by the user.

5. The transmission system according to claim 1, wherein the further signal comprises the upshift signal and downshift signal at the same time, or within a specified time-interval.

6. The transmission system according to claim 5, wherein the second next, third next, fourth next or fifth next higher or lower system transmission ratio can be chosen or adapted by the user.

7. The transmission system according to claim 1, wherein the up shift signal and the down shift signal comes from a shifter unit that is mounted on one side of the handle bar of the bicycle.

8. The transmission system according to claim 1, wherein the up shift signal comes from a first shifter unit that is mounted on the left side of the handle bar of the bicycle and the down shift signal comes from a second shifter unit that is mounted on the right side of the handle bar of the bicycle, or vice-versa.

9. The transmission system according to claim 1, wherein the controller is configured to receive a third shift signal and a fourth shift signal, wherein the upshift signal is an upshift signal for the first actuator, the down shift signal is a downshift signal for the first actuator, wherein the third shift signal is an upshift signal for the second actuator, and the fourth shift signal is a downshift signal for the second actuator.

10. The transmission system according to claim 1, wherein the transmission is a continuously variable transmission that is used to switch from the first to the second transmission ratio or vice-versa.

11. The transmission system according to claim 10, wherein the continuously variable transmission is used to switch from the first transmission ratio to the second transmission ratio and to a third transmission ratio or vice-versa.

12. The transmission system according to claim 10, wherein the first, second, and third transmission ratios can be chosen by the controller and preprogrammed by the user.

13. The transmission system according to claim 10, wherein the first and second transmission ratios can be chosen by the controller and can be adapted depending on the sprocket that is engaged with the chain.

14. The transmission system according to claim 1, wherein the transmission unit has an input coupled to the set of sprockets and an output arranged to be coupled to a wheel.

15. The transmission system according to claim 1, wherein the transmission unit has an input coupled to the system input and an output arranged to be coupled to the chain ring.

16. The transmission system according to claim 1, wherein two consecutive sprockets have a number of teeth differing by more than a predetermined percentage, and wherein the first and second transmission ratios of the transmission differ by less than the predetermined percentage.

17. The transmission system according to claim 16, wherein two consecutive sprockets have a number of teeth differing by 10-30 percent and wherein the first and second transmission ratios of the transmission differ by less than 5-20 percent.

18. The transmission system according to claim 16, wherein each pair of consecutive sprockets has their number of teeth differing by 10-30 percent and wherein the first and second transmission ratios of the transmission differ by less than 5-20 percent.

19. The transmission system according to claim 16, wherein all pairs of consecutive sprockets have their number of teeth differing by 10-30 percent on average and wherein the first and second transmission ratios of the transmission differ by less than 5-20 percent.

20. The transmission system according to claim 1, wherein on average, all pairs of consecutive sprockets have their number of teeth differing by a predetermined percentage; and wherein the first and second transmission ratios of the transmission differ by less than the predetermined percentage.

21. The transmission system according to claim 1, wherein the first transmission ratio and the second transmission ratio or a third transmission ratio differ by about 20-60 percent.

22. The transmission system according to claim 1, wherein the clutch or brake system has a clutch input, and a clutch output, the clutch or brake system including:
a first unit connectable to the clutch input or clutch output, including at least one first abutment surface;
a second unit connectable to the clutch output or clutch input, respectively, including at least one second abutment surface arranged for selectively engaging the first abutment surface, the first and second abutment surfaces being adapted to each other so as to allow disengaging under load;
a third unit including at least one retaining member, the third unit being arranged for selectively being in a first mode or a second mode relative to the second unit, wherein the at least one retaining member in the first mode locks the at least one second abutment surface for rotationally coupling the second unit to the first unit, preferably in two directions, and in the second mode releases the at least one second abutment surface for decoupling the second unit from the first unit.

23. The transmission system according to claim 1, wherein the controller is arranged to initiate a system transmission ratio change based on a wheel-speed, a crank-speed, a crank-torque, and/or a wheel-torque.

* * * * *